US011058148B2

(12) United States Patent
Hoch et al.

(10) Patent No.: US 11,058,148 B2
(45) Date of Patent: Jul. 13, 2021

(54) SMOKING APPARATUS

(71) Applicant: Eyce LLC, Bend, OR (US)

(72) Inventors: Charles V. Hoch, Bend, OR (US);
Bruce A. Hoch, Bend, OR (US)

(73) Assignee: Eyce, LLC, Boca Raton, FL (US)

( * ) Notice: Subject to any disclaimer, the term of this patent is extended or adjusted under 35 U.S.C. 154(b) by 0 days.

(21) Appl. No.: 16/688,815

(22) Filed: Nov. 19, 2019

(65) Prior Publication Data

US 2021/0051998 A1  Feb. 25, 2021

Related U.S. Application Data

(60) Provisional application No. 62/890,979, filed on Aug. 23, 2019.

(51) Int. Cl.

| A24F 1/32 | (2006.01) |
|---|---|
| B29C 45/14 | (2006.01) |
| B29C 45/00 | (2006.01) |
| A24F 1/30 | (2006.01) |
| B29L 31/00 | (2006.01) |
| B29K 83/00 | (2006.01) |

(52) U.S. Cl.
CPC ............... *A24F 1/32* (2013.01); *A24F 1/30* (2013.01); *B29C 45/0001* (2013.01); *B29C 45/14819* (2013.01); *B29K 2083/00* (2013.01); *B29L 2031/7414* (2013.01)

(58) Field of Classification Search
CPC ....................................................... A24F 1/32
USPC ......................................................... 131/178
See application file for complete search history.

(56) References Cited

U.S. PATENT DOCUMENTS

| 1,277,159 | A | | 8/1918 | Walker | |
|---|---|---|---|---|---|
| 1,934,115 | A | | 11/1933 | Burns | |
| 2,335,786 | A | * | 11/1943 | Mullica | A24F 1/22 |
| | | | | | 131/198.1 |
| 4,252,135 | A | * | 2/1981 | Herman | A24F 3/00 |
| | | | | | 131/176 |
| 5,021,638 | A | | 6/1991 | Nopper et al. | |
| 6,390,141 | B1 | | 5/2002 | Fisher et al. | |
| 2011/0036363 | A1 | * | 2/2011 | Urtsev | A24F 47/002 |
| | | | | | 131/273 |
| 2011/0061665 | A1 | * | 3/2011 | Hylton | A24F 9/16 |
| | | | | | 131/260 |

OTHER PUBLICATIONS

Himalayan Group Inc., "Clear Silicone Hand Water Pipe SL98", http://www.himalayanglass.com/product/clear-silicone-hand-water-pipe-sl-98/, (Accessed Sep. 20, 2019), 7 pages.
Protolabs, "Design Considerations for Overmolding and Insert Molding", https://www.glasspipesla.com/5-Frosted-Clear-Showerhead-Perc-Mini-Silicone-Water-Pipe-w-Clear-Bowl_p_9252.html, (Accessed Sep. 20, 2019), 10 pages.

(Continued)

*Primary Examiner* — Eric Yaary
*Assistant Examiner* — Jennifer A Kessie
(74) *Attorney, Agent, or Firm* — Dorsey & Whitney LLP

(57) ABSTRACT

A smoking apparatus comprising a main body comprising a combustion chamber fluidly coupled to an aperture in a mouthpiece; an outer layer at least partially surrounding the main body; and wherein the outer layer is formed of an at least partially transparent material and the main body is at least partially visible within the outer layer.

22 Claims, 15 Drawing Sheets

(56) References Cited

OTHER PUBLICATIONS

Puffco, "The Lucid Lightning Peak", https://www.puffco.com/products/the-lucid-lightning-peak, (Accessed Sep. 20, 2019), 11 pages.

Pyptek, "Pyptek Pocket Pipe", https://www.pyptek.com/product/pyptek-pocket/, (Accessed Sep. 20, 2019), 3 pages.

Shenzhen YHS Plastic, Technology Co., Ltd., "Unbreakable Silicone Super Clear Syringe Nectar Collector", https://yhs-silicone.en.made-in-china.com/product/ivXnprEbugRJ/China-Unbreakable-Silicone-Super-Clear-Syringe-Nectar-Collector.html, (Accessed Sep. 20, 2019), 10 pages.

Smoke Rolla, "3.25" Chillum Pipe Silicone Cover Glass Pipe Color Design", https://wholesale.smokerolla.com/collections/hand-pipes-wholesale/products/3-25-chillum-pipe-silicone-cover-glass-pipe-color-design, (Accessed Sep. 20, 2019), 3 pages.

Twisted Labs, "Fuchsia LED Beaker Silicone Water Pipe", https://www.thetwistedlab.com/product/fuchsia-led-beaker-silicone-water-pipe/, (Accessed Sep. 20, 2019), 3 pages.

Waxmaid, "3" Silicone & Glass Hybrid Blunt Bubbler", https://waxmaidstore.com/collections/water-pipes/products/waxmaid-bubbler, (Accessed Sep. 20, 2019), 3 pages.

Waxmaid, "8.5" Horn Silicone & Glass Hybrid Water Pipe", https://waxmaidstore.com/collections/water-pipes/products/horn-water-pipe, (Accessed Sep. 20, 2019), 3 pages.

Waxmaid, "Waxmaid Nectar Collector", https://waxmaidstore.com/collections/nector-collector, (Accessed Sep. 20, 2019), 2 pages.

Corning Museum of Glass, "Reticello", https://www.youtube.com/watch?v=xCrdewFgObc; (Accessed Jan. 4, 2021), Nov. 23, 2011, 3 pages.

Ooze, "Stack Pipe—Stack Pipe Silicone Bubbler—Orange / Clear", https://www.oozelife.com/products/ooze-stack-pipe-silicone-bubbler-orange-clear, (Accessed Jan. 4, 2021), 5 pages.

* cited by examiner

SMOKING APPARATUS

CROSS-REFERENCE

The application claims priority to U.S. Patent Application No. 62/890,979 filed 23 Aug. 2019, which is incorporated by reference herein, in the entirety and for all purposes.

TECHNICAL FIELD

The following detailed description relates to a smoking apparatus. More particularly, the description relates to a smoking apparatus with a main body with an outer layer of an at least partially transparent material.

BACKGROUND

Current silicone smoking apparatuses offer advantages, such as durability and lightweight characteristics. They may have a limited variety of desired visual effects implemented with respect to a particular shape. There may be perceived disadvantages when comparing silicone to the traditional pipe material of glass. One of those disadvantages may be the limitation of visual effects that can offer uniqueness within a particular shape. Generally, silicone rubber is visibly differentiated from glass by a solid surface and/or opaque or semi-opaque appearance, and it may be considered difficult to create visual depth effects where silicone is used in the manufacture of the smoking apparatus.

Another potential disadvantage of current silicone smoking apparatuses is the temporary or permanent discoloration and/or irreversible oxidation or damage to silicone pipes from general use. For example, a surface of silicone rubber may be temporarily or permanently discolored or damaged when exposed to the tars that may be produced when burning smoking products such as tobacco or hemp. This damage may be in the form of discoloration, and may be more noticeable when the silicone pipe is clear, transparent or light in color. Solid colored silicone rubber may mask the oxidation, which is why it may be used in smoking apparatuses. Silicone may also become dirty more easily than other materials, such that clear or lighter colored silicones may not typically be used for devices that will be constantly or consistently subjected to handling.

There is a need for a smoking apparatus which includes an enhanced variety of aesthetic appearances, and/or improved performance related to discoloration or oxidation.

SUMMARY

In an example, a smoking apparatus includes a main body of a first material including a combustion chamber fluidly coupled to an aperture of a mouthpiece. The main body has an outer shape. An outer layer of a second material at least partially surrounds the main body. The second material has a deformable property. The outer layer is formed of an at least partially transparent material and the outer shape of the main body is at least partially visible through the outer layer.

In an example, the smoking apparatus includes a receptacle positioned at least partially within the combustion chamber. The receptacle shields the outer layer from contact with combustibles positioned within the receptacle.

In an example, the main body further includes at least one decorative feature positioned about an outer surface of the main body. The outer layer surrounds the at least one decorative feature.

In an example, the at least one decorative feature is placed on the outer surface of the main body. The outer layer surrounds the at least one decorative feature.

In an example, the at least one decorative feature is formed on the outer surface of the main body. The outer layer surrounds the decorative feature.

In an example, the main body forms a border about the aperture of the mouthpiece, and the outer layer is positioned adjacent the border.

In an example, an outer surface of the outer layer has a shape which is substantially similar to a shape of an outer surface of the main body.

In an example, an outer surface of the outer layer has a shape that includes relief features created by surface features positioned on the main body.

In an example, the outer layer is overmolded onto the main body.

In an example, the second material has an elastically deformable property.

In an example, a smoking apparatus includes a main body with an outer surface and fluid pathway extending through the main body. The main body has an outer shape. An outer layer is at least partially molded about at least a part of the outer surface of the main body. The outer layer is formed of an at least partially transparent material and the outer shape of the main body is at least partially visible through the outer layer.

In an example, the smoking apparatus includes a proximal end, and the outer layer at the proximal end has a consistent thickness.

In an example, the smoking apparatus includes a proximal end, and the outer layer at the proximal end has a varying thickness.

In an example, the smoking apparatus includes a terminal end, and the outer layer at the terminal end has a consistent thickness.

In an example, the smoking apparatus includes a terminal end, and the outer layer at the terminal end has a varying thickness.

In an example, the smoking apparatus includes a receptacle and the receptacle is assembled to the main body and outer layer.

In an example, an outer surface of the outer layer has a shape which is substantially similar to an outer shape of the main body.

In an example, an outer shape of the outer layer is substantially dissimilar to an outer shape of the main body.

In an example, the main body further includes at least one decorative feature positioned about the outer surface of the main body. The outer layer is molded over the decorative feature.

In an example, the outer layer is formed via an insert mold and positioned about the main body.

In an example, a smoking apparatus includes a main body with an outer surface and fluid pathway extending through the main body. The main body has an outer shape. An outer layer is at least partially molded about at least a part of the outer surface of the main body. A power source is configured to supply power to an electrical component. The outer layer is formed of an at least partially transparent material and the outer shape of the main body is at least partially visible through the outer layer.

BRIEF DESCRIPTION

DETAILED DESCRIPTION

Figure 1:
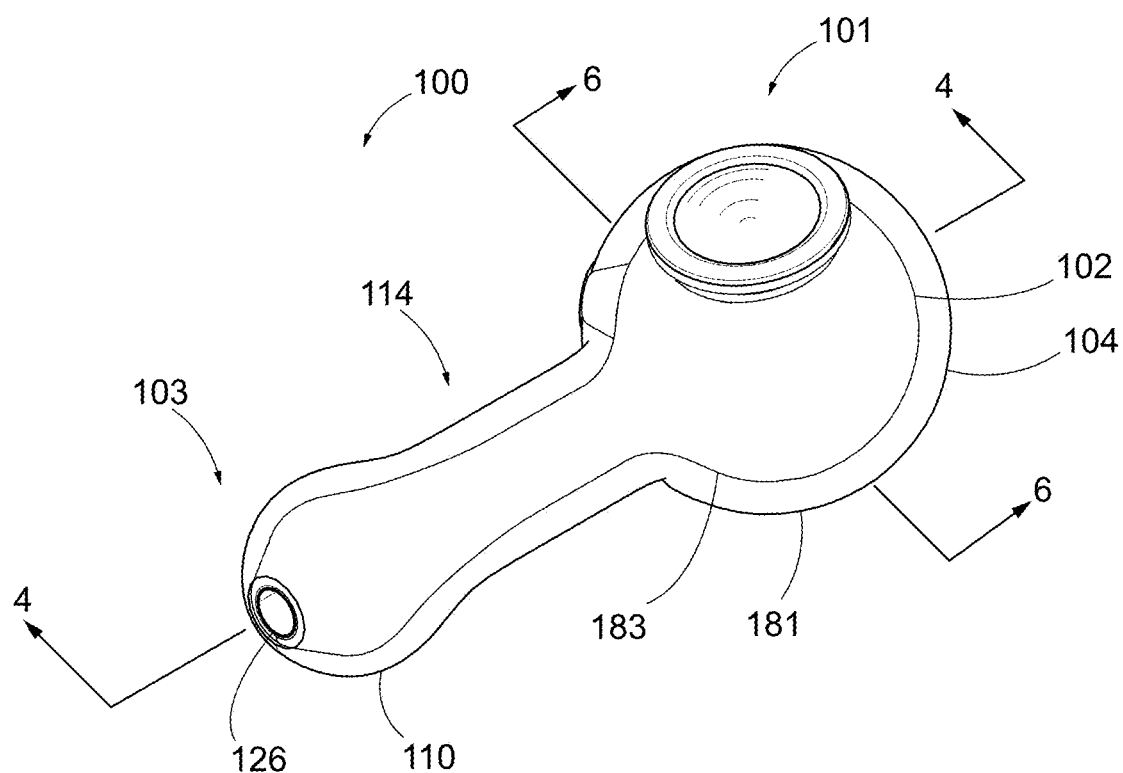
FIG. 1 shows a perspective view of a smoking apparatus in accordance with an example.

The following description generally relates to a smoking apparatus with a main body with a fluid pathway extending there through, the main body at least partially covered with an outer layer of an at least partially transparent, flexible, and/or resilient material. The application of a flexible material to a main pipe body may offer many advantages, such as durability, weight, and ease of varying design aesthetics.

The apparatus of the current disclosure depicts a smoking apparatus with a main body at least partially covered by an outer layer or body. In some examples, the smoking apparatus may include a layer of an at least partially transparent silicone rubber formed over a main body to create a single, non-separable part. In some examples, a smoking apparatus has a main body with a visual effect that is visibly depicted through an outer layer. In some examples, the apparatus may be formed using a technique commonly known as over-molding or insert-molding. In some examples, the main body may include a lumen or gas pathway extending through it, with an outer layer formed of an at least partially transparent silicone rubber. The silicone rubber outer layer or body of the disclosed apparatus and/or method may provide an advantage in contrast to smoking apparatuses made of other materials, such as glass, because it is able to withstand somewhat rough handling, such as that when the apparatus may be stored, used and/or transported.

In some examples, the outer layer may appear to be clear or at least partially transparent, but the outer layer may include attributes of durable silicone rubber, such as at least one of being clear, durable, deformable or resilient. Deformation or resiliency may be interpreted as the elastic deformation of a solid that is reversible, path-independent (such as deformation being caused by internal or external loading that includes extension, compression, bending and twisting) and fully or at least partially recovered on unloading. For example, if a user presses a finger tip into the outer layer, the outer layer may deflect as the force is applied. Once the force from the finger tip is removed, the outer layer may rebound to appear unchanged. In some examples, the material may deform and rebound to show a remnant effect, such as a depression, from the force. In some examples, the outer layer is elastically, resiliently and/or reversibly deformable, such that it is capable of absorbing internal or external loading or forces. The deformation caused by the loading forces may not cause permanent deformation or damage, or may in some instances result in some remaining deformation. In some examples, the outer layer may be elastically deformed upon the application of an external load or force. Upon the removal or unloading of the external load or force, the outer layer at least partially or entirely returns or reverts to its original shape and/or size, or surface contour.

In some examples, the outer layer may be formed of a material having a Shore A scale durometer in the range 0-100, in some examples having an extra soft Shore A durometer inclusive of the range of 0-10, a soft Shore A durometer inclusive of the range of 10-35, a medium-soft Shore A durometer inclusive of the range of 35-60, a medium hard Shore A durometer inclusive of the range of 60-80, a hard Shore A durometer inclusive of the range of 80-100, or a Shore A durometer value in multiple ranges.

In some examples, the outer layer may be formed of a material having a Shore 00 scale durometer in the range 0-100, in some examples having an extra soft Shore 00 durometer inclusive of the range of 0-50, a soft Shore 00 durometer inclusive of the range of 50-70, a medium-soft Shore 00 durometer inclusive of the range of 75-90, a medium hard Shore 00 durometer inclusive of the range of 90-100, or a Shore 00 durometer value in multiple ranges.

In some examples, the outer layer may be formed of a material having a Shore D scale durometer in the range 0-100, in some examples having an medium hard Shore D durometer inclusive of the range of 0-30, a hard Shore D durometer inclusive of the range of 30-60, an extra hard Shore D durometer inclusive of the range of 60-100, or a Shore D durometer value in multiple ranges.

In some examples, the main body, if made of a moldable material, may have similar properties to the outer layer. In some examples, the main body may be rigid, flexible, durable, deformable, or resilient. In some examples, the main body may be formed of a material with a Shore 00, Shore A, or Shore D scale durometer.

In some examples, the apparatus is a smoking apparatus constructed of a base part or main body that may extend to all openings and surfaces that may come in contact with the tars or contamination from a combusted smoking product, or heat from a type of ignition source. In examples where the main body extends to an outlet opening and surfaces that may come in contact with the contaminants described above, the main body may help to protect the outer layer from heat from a type of ignition source, provides oxidation resistance, and effectively prevent or reduce the oxidation and/or discoloration from contaminants. In some examples, a smoking apparatus includes a main body including a receptacle or bowl positioned at an inlet to the main body, the bowl also covering the opening in the outer layer and surrounding surface from the same heat, oxidation, contaminants and/or discoloration. In some examples, the apparatus is constructed to help add at least one visual depth effect.

Additionally, the present disclosure includes a method of utilizing a manufacturing technique in one example of forming the disclosed smoking apparatus.

FIGS. 1-4B and 6-7 are various views of an example of a smoking apparatus. In some examples, the smoking apparatus may include a proximal end or enlarged end or enlarged portion 101 coupled with a stem 114 extending away from the enlarged end. On the other end of the stem, opposite the proximal end or enlarged end 101, is the terminal end 103. A fluid pathway is formed through the smoking apparatus, from the proximal end to the terminal end. In some examples, and with reference to FIGS. 1 and 2, the smoking apparatus 100 includes a main body 102 and an outer layer 104, and the fluid pathway extends through the main body. The outer layer 104 may be a layer that at least partially covers various portions or segments of the main body 102, and as shown here, may encapsulate various portions or segments, or substantially the entirety, of the main body 102. In some examples, the outer layer 104 is formed of an at least partially transparent material, in which case the shape, size, and color of the main body 102, and any other features if present, may be visible through the at least partially transparent outer layer 104.

In some examples, the main body 102 is formed using a solid-colored material, such as silicone rubber. Examples of silicone rubber for use in some example embodiments include compression molded, platinum cured silicone. In some examples, the main body may or may be formed with cured pigments. In some examples, the outer layer, which may form an outer body, may have a generally consistent thickness about the main body. In some examples, different portions of the outer layer may have a thickness that varies. In some examples, an outer surface 181 of the outer layer may have the same, similar, or different shape from an outer surface 183 or outer shape of the inner layer.

In some examples, the outer layer is formed so that the main body is visible through the outer layer. In some examples, the outer layer is formed of an at least partially transparent material and the main body is at least partially visible within the outer layer. Examples of an at least partially transparent material include 100% optically clear liquid silicone rubber, clouded clear compression molded silicone rubber, hardened silicone, and heat-cured rubber (HCR) silicone.

In some examples, the main body of a smoking apparatus, such as the smoking apparatus 100 of FIGS. 1-4B and 6-7, may include a first or enlarged portion 101 or end coupled with a stem 114 extending away from the enlarged end. On the other end of the stem, opposite the proximal end or enlarged end 101, is the terminal end 103.

Figure 4A:
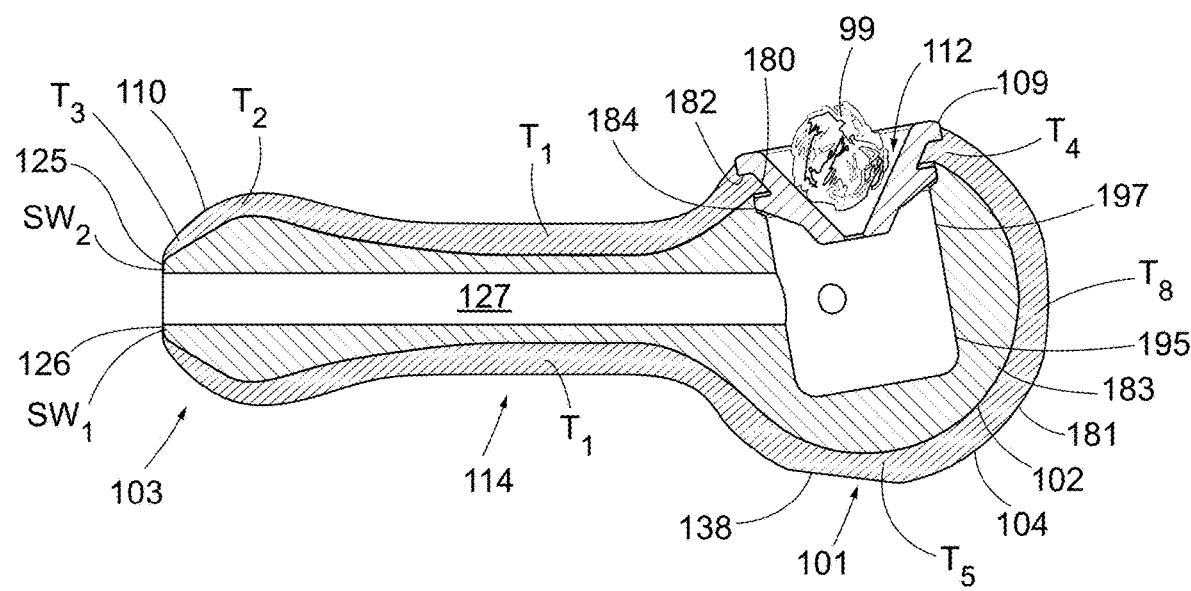
FIG. 4A shows a cross-sectional view along line 4-4 of the smoking apparatus of FIG. 1.
Figure 4B:
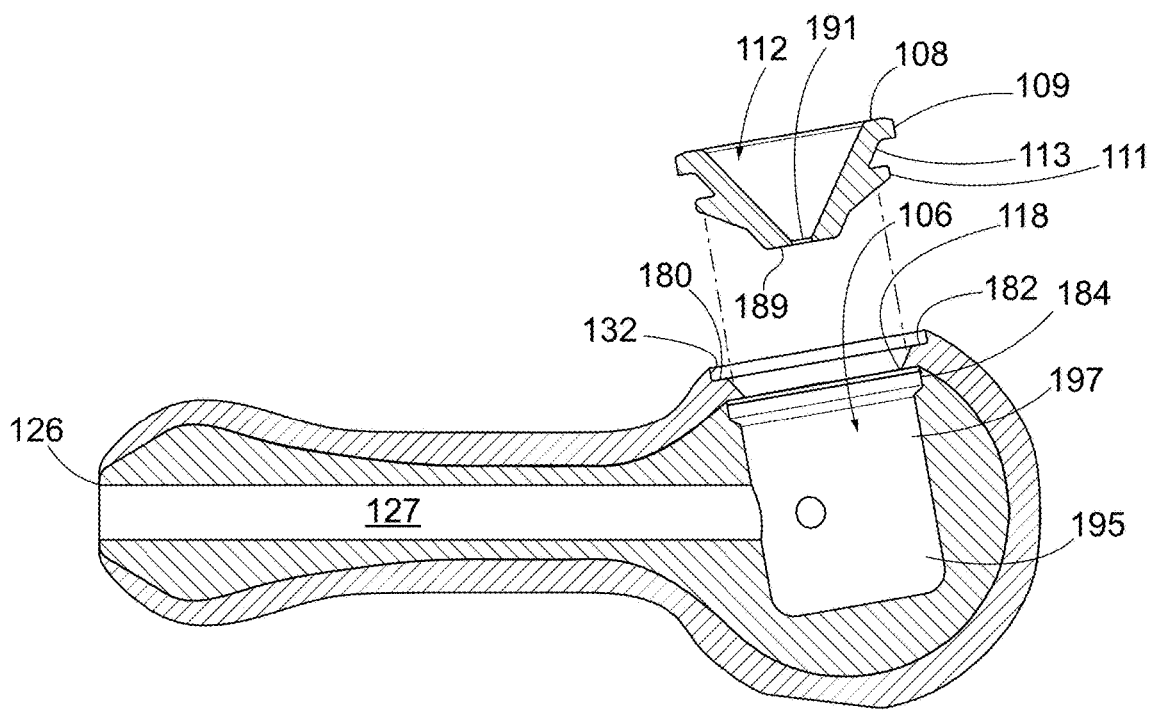
FIG. 4B is a partially exploded view of the cross-sectional view of the smoking apparatus of FIG. 4A.

FIGS. 4A-4B and 6-7 includes various cross sectional views of the smoking apparatus 100. FIG. 4A is a cross-sectional view of the smoking apparatus 100 taken along line 4-4 of FIG. 1. FIG. 4B is a partially exploded view of FIG. 4A. As shown in FIGS. 4A-4B, the enlarged end 101 includes a combustion chamber 106.

The combustion chamber 106 includes an inlet and may have an upper region 197 and a lower region 195. The upper region 197 may include an ignition region 112 formed at least partially by a recess 132 and receptacle 108. The recess 132 includes a large aperture 118 formed through the main body 102 and the outer layer 104. A smoking product or combustibles 99 may be placed at least partially within the ignition region 112.

Figure 7:
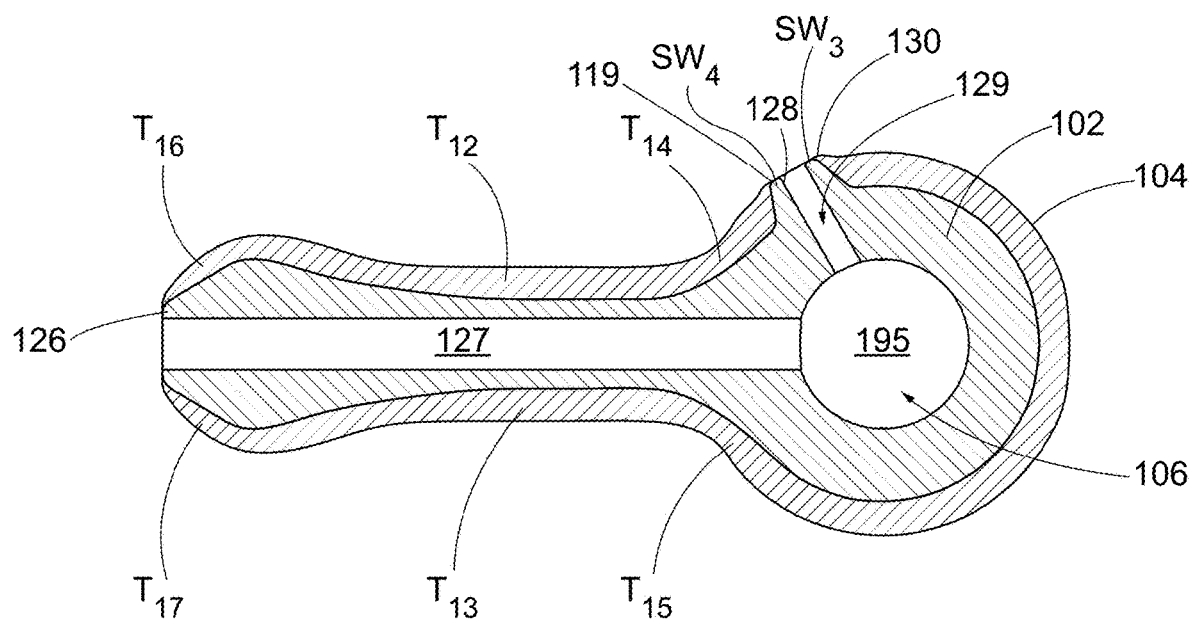
FIG. 7 shows a cross-sectional view along line 7-7 of the smoking apparatus of FIG. 2.

As shown in FIG. 7, the lower region 195 of the combustion chamber 106 may also include a vent aperture 128 formed in a sidewall 130 of the enlarged end 101. The vent aperture 128 may be fluidly connected to a lower region 195 of the combustion chamber via a lumen 129.

Figure 3:
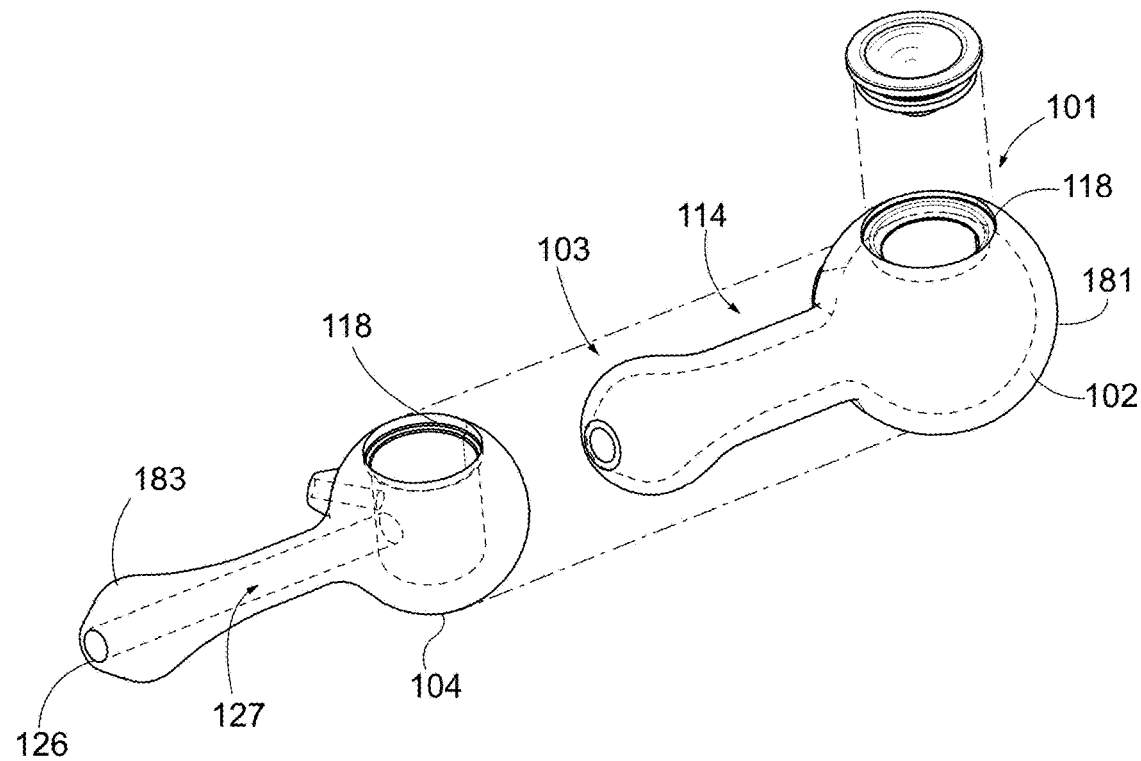
FIG. 3 shows an exploded view of the smoking apparatus of FIG. 1.

As shown in FIG. 3, the stem 114 may include a lumen 127 that ends through the stem 114, fluidly connecting the combustion chamber with an aperture 126 of the terminal end 103. In some examples, the terminal end 103 is a mouthpiece 110. The stem and terminal end may be formed at an angle with the combustion chamber. In some examples, the angle may be substantially perpendicular, substantially 90 degrees, or between 45 and 135 degrees.

In some examples the outer layer 104 and main body 102 may include features to help assemble various components together, such as at T4 in FIG. 4A. As shown in FIG. 4B, the combustion chamber's recess 132 includes a first groove 182 and flange 180 formed in the outer layer 104, and a second groove 184 formed in the main body 102. The first groove 182, flange 180, and second groove 184 may help to form the aperture 118. In some examples, the shape of the first groove 182, flange 180 and second groove 184 may be similar or different. The overall shape of the aperture 118 may be circular, oval, square, oblong shaped, etc. In this example, the flange 180 of the combustion chamber is formed in the outer layer 104, and the second groove 184 that receives the flange 111 of the receptacle 108 is formed in the main body 102.

The shape of the aperture 118 may be designed to receive the receptacle 108 for holding a smoking product. As shown in FIGS. 4A and 4B, in some examples, the ignition region 112 is formed at least partially by the receptacle 108. The receptacle 108 may be positioned in the upper region 197 of the combustion chamber 106. The receptacle 108 may be received in the large aperture 118, and the groove 182 and flange 180 of the combustion chamber's recess 132 may help to position the receptacle with the main body 102 and outer layer 104. In some examples, the receptacle does not engage with grooves or flanges of the combustion chamber of the main body and outer layer, and in some instances, may be press-fit into place.

As shown in FIG. 4B, in some examples, the receptacle 108 may be a tapered bowl, funnel, and/or shaped container with an aperture 191 positioned at a bottom end 189. The receptacle 108 may include a lip 109 at its upper edge, and a flange 111 extending around an outer surface of the receptacle 108 and spaced below the lip 109 to form a groove 113. The combustion chamber's flange 180 may be received into the receptacle's groove 113 formed between the lip 109 and flange 111 to removably secure the receptacle within the aperture 118 of the recess 132 of the combustion chamber. The receptacle lip 109 may be designed to seat within the recess's first groove 182 and against the flange 180. The receptacle flange 111 may be designed to seat within the second groove 184 of the combustion chamber 106. The position of the lip 109 of the receptacle 108 may extend partially over the outer layer 104, as shown in FIG. 4A. In some examples, the grooves and flanges that form the recess 132 may be different on other product structures. In some examples, the features of the receptacle such as the lip, flange and groove, may be different on other product structures. In some examples, the receptacle does not include flanges or lips and may take the form of a funnel, bowl, or cylindrical container with at least two openings.

As shown in FIG. 4A, the outer layer 104 surrounds various portions of the main body 102. In some examples, the thickness of the outer layer 104 at different locations may be similar, such as about the stem 114 at T1 and T7. In some examples, the thickness may vary, such as decreasing in dimension from thickness T1 to T2 to T3 at the mouthpiece 110 formed in the terminal end 103. In some examples, the thickness may be zero at some locations if desired.

As shown in FIG. 4A, in some examples, the thickness of the outer layer 104 may be such that the outer layer has a generally similar shape to that of the main body. For example, the thickness of T8 may be somewhat constant around a portion of the enlarged end 101, so that the shape of the outer surface 181 of the outer layer 104 is similar to the shape of the outer surface 183 of the main body 102 at that specific location or segment.

In some examples, the thickness may vary, such as at T5, where the shape of the outer layer is dissimilar and includes different features as that of the shape of the main body 102. For example, the outer layer 104 has a flat face 138 whereas the corresponding main body portion is rounded.

Figure 6:
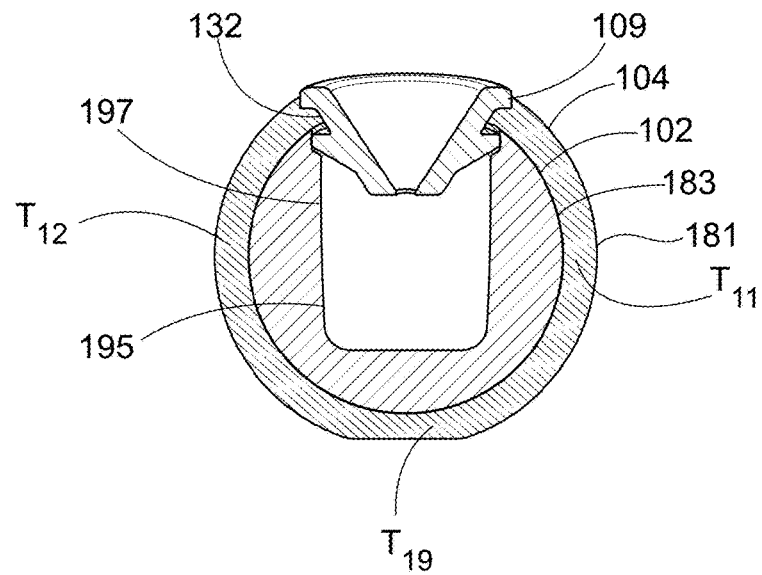
FIG. 6 shows a cross-sectional view along line 6-6 of the smoking apparatus of FIG. 1.

FIG. 6 is a cross-sectional view of the smoking apparatus 100 taken along line 6-6 of FIG. 1, showing the upper region 197 and lower region 195 of the combustion chamber. Similar to that shown in FIG. 4A, the thickness of the outer layer T11 and T10 may be generally similar and consistent in some examples, so that the shape of the main body 102 is replicated by the outer surface 181 of the outer layer 104 near or about enlarged end 101. As shown by thickness T19, the outer layer thickness may vary and be dissimilar to the corresponding part of the main body that the outer layer is positioned about.

Figure 2:
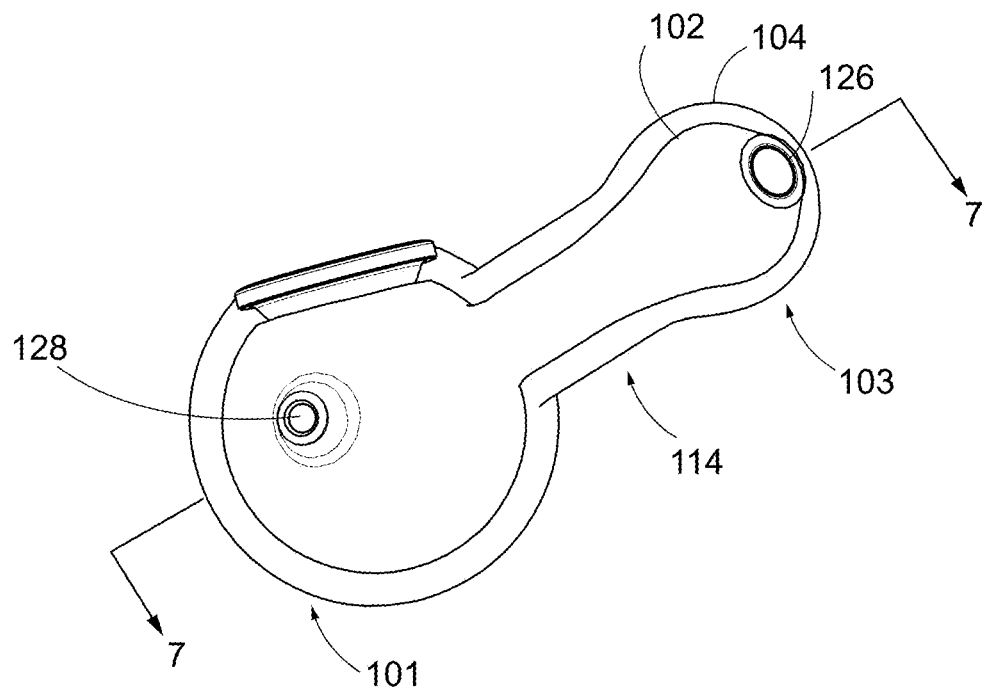
FIG. 2 shows another perspective view of the smoking apparatus of FIG. 1.

FIG. 7 is a cross-sectional view of the smoking apparatus 100 taken along line 7-7 of FIG. 2, with a view of the lumen 127 and lower region 195 of the combustion chamber. The thicknesses T12 and T13 are larger than thicknesses T14 and T15, such that the hourglass exaggerated shape of the main body at those locations about the stem 114 is less exaggerated in the outer layer 104. The varied thickness makes the outer layer 104 appear bulkier or more robust than the main body 102 at the stem 114. The thicknesses T16 and T17 vary to enhance or further exaggerate the shape of the outer layer near the mouthpiece 110 formed in the terminal end 103.

As shown in FIG. 4A, a smoking product 99 may be positioned within the ignition region 112 of the smoking apparatus. In use, the smoking product 99 is ignited to form a gaseous combusted product. The combusted product in the ignition region may be drawn into the lower region 195 of the combustion chamber. The drawn combusted product may then be drawn through the lumen 127 of the stem 114 and exit the apparatus at the aperture 126 formed at the mouthpiece in the terminal end 103.

Figure 5:
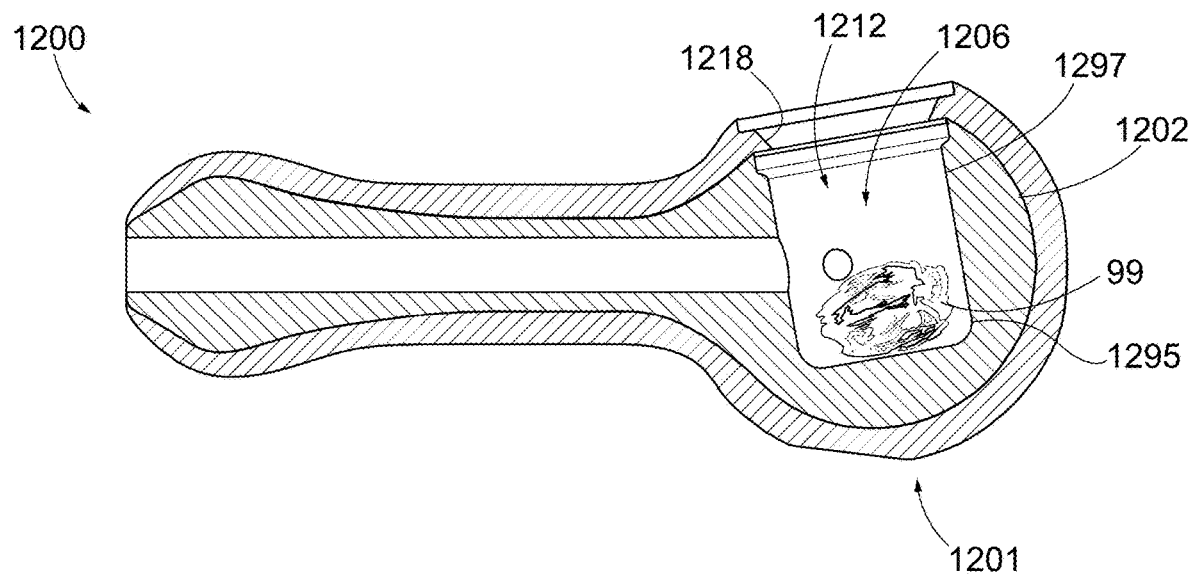
FIG. 5 shows a cross-sectional view of a smoking apparatus in accordance with an example.

FIG. 5 is an example of a smoking apparatus 1200 with the main body 1202 having an inlet in the enlarged end 1201 configured to receive a smoking product 99. The main body 1202 may include a combustion chamber 1206 with an ignition region 1212 formed in either or both of the upper region 1297 or lower region 1295. In some examples, the shape of the aperture 1218 in the enlarged end 1201 is designed to allow a smoking product to be inserted into the ignition region 1212 of the combustion chamber 1206 in the main body. In some examples, the main body may be formed of metal or glass and the smoking product may be ignited or combusted in the ignition region 1212.

FIGS. 8-12 show perspective views of examples of a smoking apparatus with features that may be similar to those of the smoking apparatus 100. For example, in FIG. 8, the smoking apparatus 200 includes features similar to the previously described smoking apparatus 100, with a main body 202 and an outer layer 204. Unlike the generally smooth outer surface of the main body 102 of FIGS. 1-6, the main body 202 of FIG. 8 includes a decorative feature, such as ridge 250, positioned about the body 202 in a pattern or design. In some examples, the main body may include multiple integrally formed raised or indented features, such as design elements, surface features (e.g., ridges or valleys) that extend around at least portions of the outer surface of the main body.

The decorative features may be positioned about various portions of the main body, such as the proximal end 201, stem 214, or terminal end 203 of combinations thereof. "Positioned about" may be interpreted as including integrally formed features and/or separately formed features attached to or placed on the outer surface of the main body. The surface features may be formed integrally with the main body 202, or alternatively, maybe formed separately from the main body and secured to the main body prior to the application of the outer layer over the main body. In some examples, a pattern formed on the outer surface of the main body may be replicated in the outer surface of the outer layer.

For instance, the outer layer 204 may have a shape that is generally or substantially similar to or the same as the outer shape of the main body, or be similar to or the same as features formed on the main body 202. In some examples, the outer surface of the outer layer has a shape that includes relief features created by surface features positioned on the main body. In some examples, the outer layer 204 may have a generally constant thickness, thereby reflecting or including relief features, such as a ridge similar to that of a ridge 250 or other raised or indented features, creating a tactically detectable feature in addition to a generally smooth outer surface on the outer layer. In some examples, the outer layer 204 may include inconsistent thickness, so that there is no relief or that the relief is minimized, and the raised or indented features formed on the outer surface of the main body are not tactilely detectable on the outer surface of the outer layer 204, but still optically visible through the outer layer.

Figure 8:
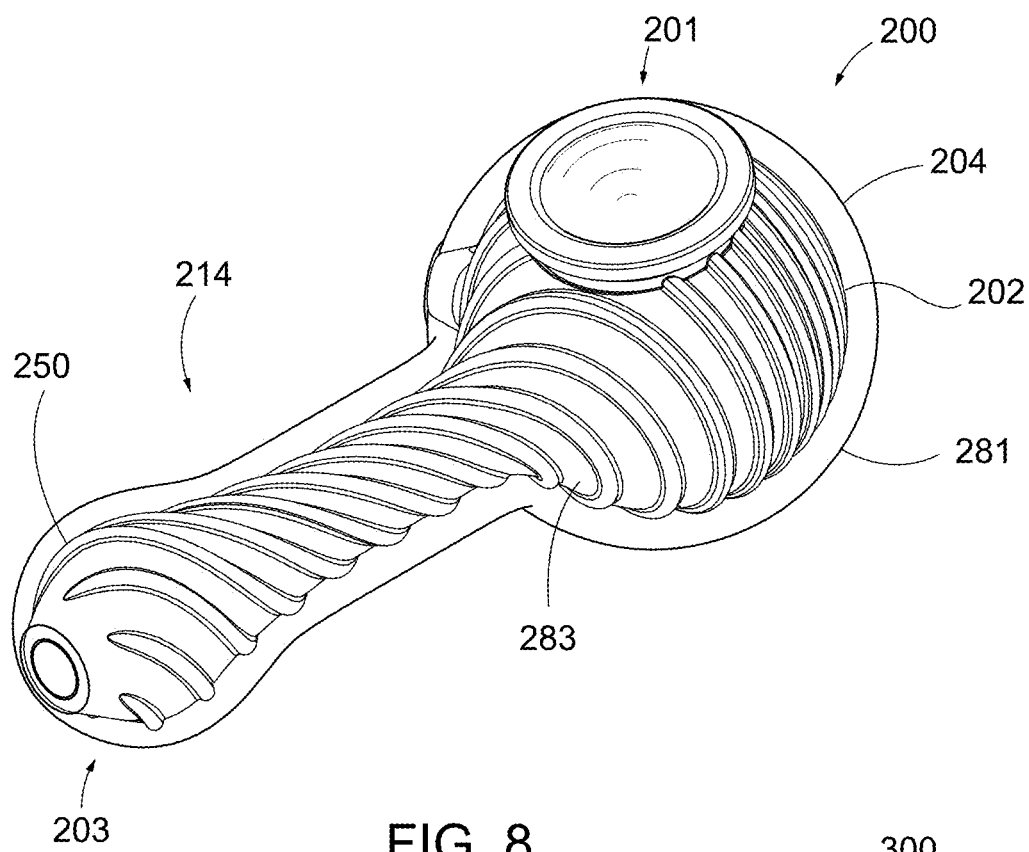
FIG. 8 shows a perspective view of a smoking apparatus in accordance with an example.

As shown in FIG. 8, the patterns or designs used may include a cane pattern, uniform, abstract, singular or repeating patterns, lines, shapes, or other characteristics, to further create a visual effect. The ridge 250 may be formed integrally with the main body 202, or alternatively, may be formed separately from the main body and secured to the main body or the outer surface 283 of the main body prior to the application of the outer layer 204 over the main body 202. The outer surface 281 of the outer layer 204 may include relief that reflects that shape of the underlying ridge or it may be smooth as shown in FIG. 8.

Figure 9:
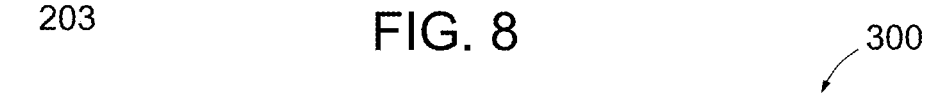
FIG. 9 shows a perspective view of a smoking apparatus in accordance with an example.

FIG. 9 shows a perspective view of a smoking apparatus 300 with features that may be similar to those in previously disclosed examples, with the main body 302 encapsulated at least in part by the outer layer 304. The smoking apparatus 300 includes at least one decorative feature, such as a component or decorative element 352 that is a made separately from the main body 302 and applied, attached, and/or secured to the main body before the outer layer is formed. The decorative features may be secured to the main body, such as to the outer surface 383 of the main body to be held in place during the application of the outer layer, about a variety of locations on the outer surface 383 of the main body, including around the proximal end 301, stem 314, or terminal end 303. The outer layer 304 is formed over the main body 302. Examples of separable decorative features include but are not limited to any one or a combination of precious and non-precious gems, stones, shells, glitter, beads, stickers, charms, buttons, cloth, fiber, memorabilia, pendants, jewels, logos, natural, human-made, organic, non-organic elements, compounds, materials, electrical components, light emitting diode (LED), lights, or LED displays.

As shown in FIG. 9, the outer surface 381 of the outer layer 304 may be smooth or may have relief formed by the contours of the surface features positioned on or formed on the main body. In some examples, the outer layer 304 may be formed in order to replicate the outline of the decorative features in the outer surface of the outer layer. This may be done by using an outer layer having a generally constant thickness that allows the decorative element 352 to be tactilely and optically visible when grasping the outer surface 383 of the smoking apparatus. In other examples, the outer surface 383 of the outer layer 304 is maintained as a smooth surface without the replication of the decorative features. The outer layer may be formed with a variable thickness so that the separable decorative features are not tactilely detectable but still optically detectable or visible. In some examples, the outer surface 383 may include a combination of smooth surface with relief.

Figure 10:
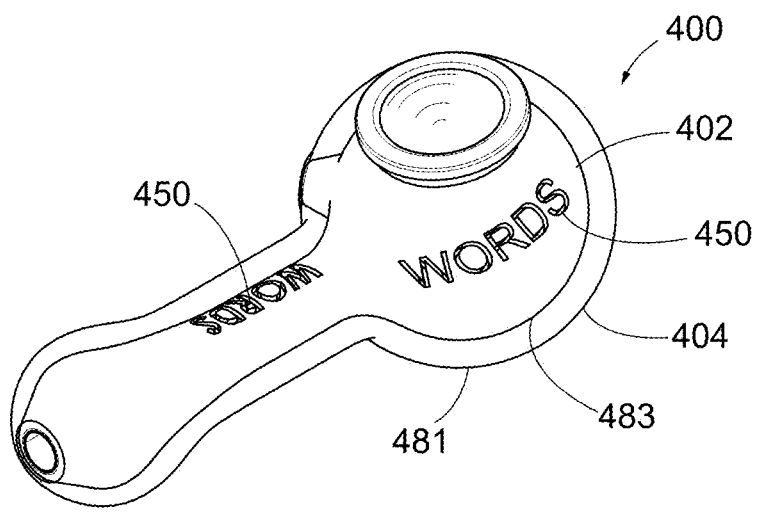
FIG. 10 shows a perspective view of a smoking apparatus in accordance with an example.

FIG. 10 shows a perspective view of a smoking apparatus that may include similar features as those of previously disclosed examples, with the main body 402 at least partially encapsulated by the outer layer 404. The smoking apparatus 400 may include a decorative feature, such as a raised or indented feature 450 similar to the ridge 250 in FIG. 8, and positioned about the proximal end, stem, terminal end, or combinations thereof on an outer surface 483 of the main body 402. In some examples, the raised or indented feature 450 may be in the form of text or a symbol that is formed integral with the main body 402. In some examples, the outer layer 404 may be formed with a generally constant thickness that allows the feature 450 to be tactilely and optically detectable when holding the smoking apparatus. In other examples, the outer layer may be formed with a variable thickness so that the feature 450 is not tactilely detectable but may still be optically detectable. In some examples, the top edges of the feature 450 may be flush, above, or just below the outer surface 481 of the outer layer.

Figure 11:
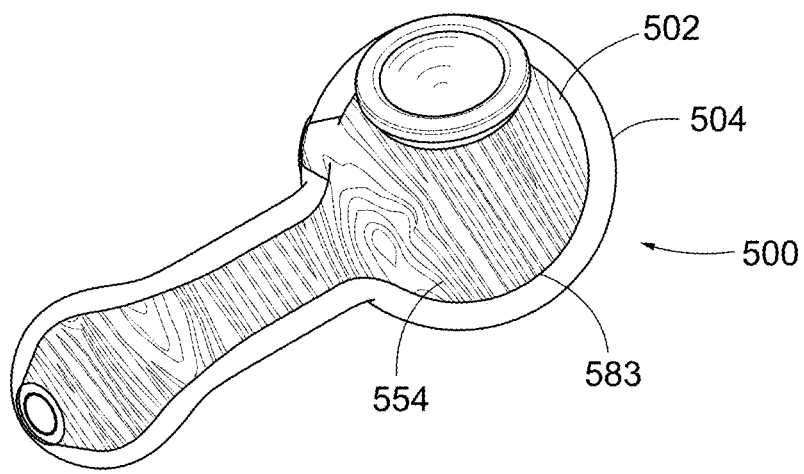
FIG. 11 shows a perspective view of a smoking apparatus in accordance with an example.

FIG. 11 shows a perspective view of a smoking apparatus 500 that may be similar to previously disclosed examples, with the main body 502 at least partially encapsulated or covered by the outer layer 504. In some examples, the main body may be formed from a material such as wood, metal, fiber, cloth, stone, ceramic, silicone, plastic or combinations thereof. In some examples, the features or visible aspects of the material are exposed on the outer layer of the main body. The smoking apparatus 500 may also include a decorative feature, such as a pattern or graphic 554, such as a wood grain or marble, that is implemented onto the outer surface 583 of the main body 502 or is shown on the outer surface of the main body. In some examples, the use of the clear outer layer 504 may also allow for a delicate or non-robust surface coating to be used to form the pattern 554, as the outer layer will act as a protective barrier against aesthetic damage or flaking, while enabling the pattern to be observed or optically detectable.

Figure 12:
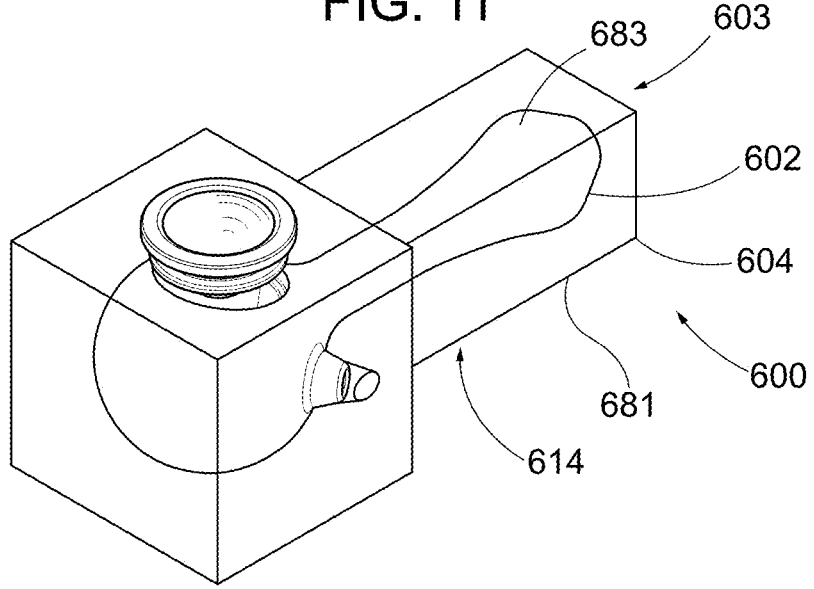
FIG. 12 shows a perspective view of a smoking apparatus in accordance with an example.

FIG. 12 shows a perspective view of a smoking apparatus 600 that may include features similar to previously disclosed smoking apparatus examples with a main body 602 with an outer layer 604 that may be positioned over, molded, or overmolded onto at least a portion of the main body. As shown in FIG. 12, the outer surface 681 of the outer layer 604 has an overall shape that is dissimilar to the overall shape of the main body 602, in part or in total as here. For example, the proximal end 601 of the main body 602 is generally spherical, while the surrounding outer layer 604 at that portion is cube- or block-like. Similarly, the slender stem section 614 and terminal end 603 are not reflected in the shape of the block-like outer layer 604. The smoking apparatus 600 allows both the shape of the outer layer 604 and the main body 602 to be optically detected, while only the dissimilar shape of the outer layer is tactilely detectable.

Figure 13:
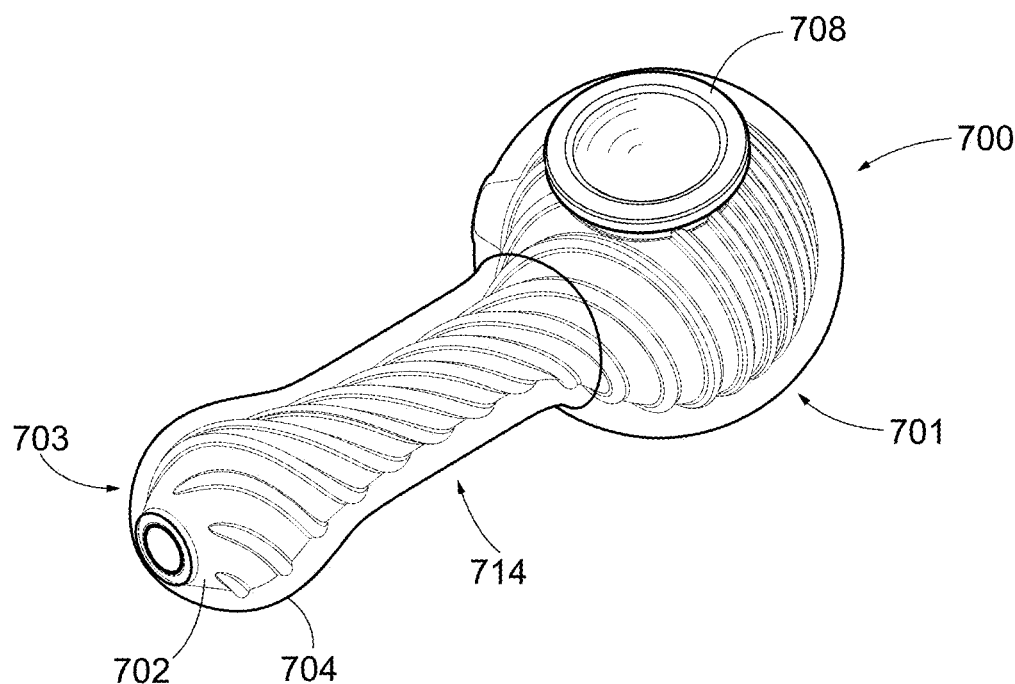
FIG. 13 shows a perspective view of a smoking apparatus in accordance with an example.
Figure 14:
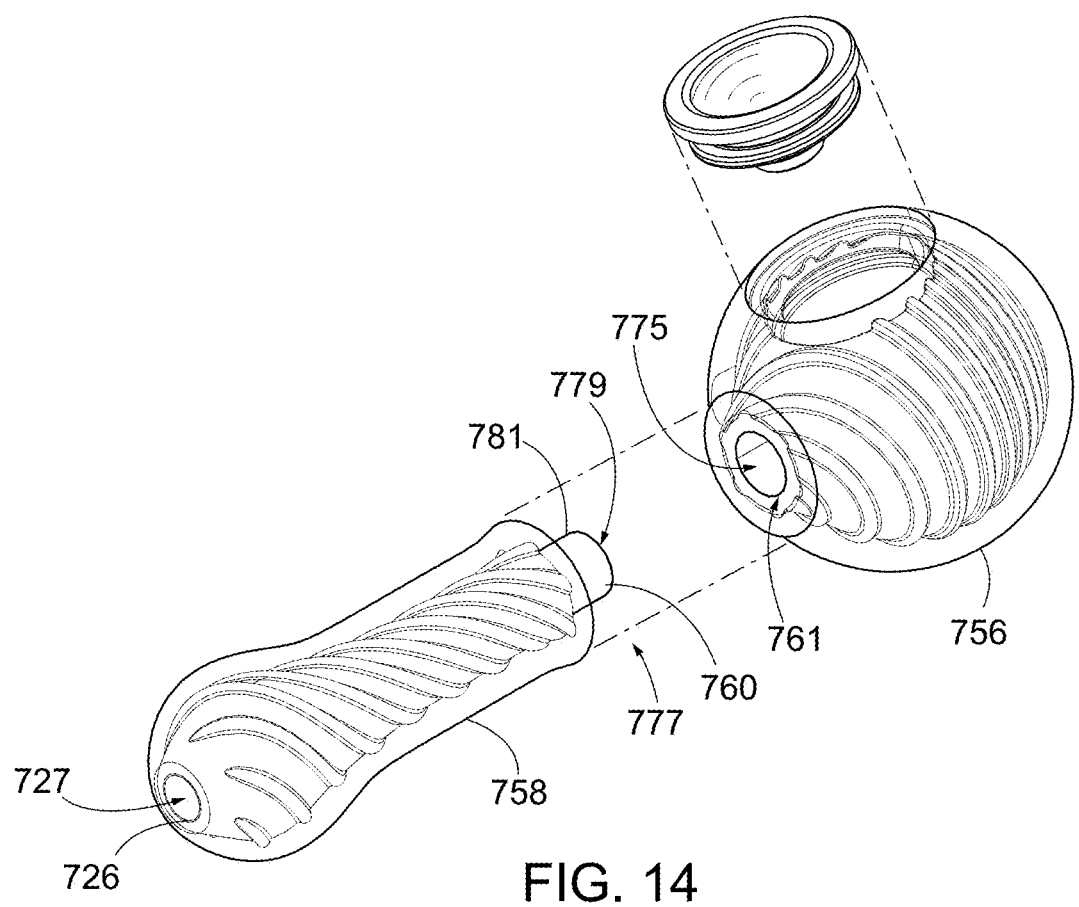
FIG. 14 shows a partially exploded view of the smoking apparatus of FIG. 13.

FIG. 13 shows a perspective view of a smoking apparatus 700 in accordance with an example. FIG. 14 shows a partially exploded view of the smoking apparatus 700. The smoking apparatus 700 may include features similar to previously disclosed smoking apparatus examples, with a main body 702 at least partially coated or covered with an outer layer 704, and a receptacle or bowl 708. In this example, the smoking apparatus 700 may be separable into subcomponent parts and be reassembled for use when desired. The separable nature of the smoking apparatus may allow it to be more easily transported, stored, and/or cleaned. For example, the smoking apparatus may be disassembled so that the enlarged end 101 is in a first piece 756, and the stem 714 and engagement end or terminal end 703 are in the a second piece 758.

In the example of FIGS. 13 and 14, the second piece 758 may form apertures 726 and 779 on opposite ends, with a lumen 727 extending between the apertures. A male end 760 may be formed by a collar 781 that extends from around the aperture 779 formed on the end 777. The collar 781 extends axially from the end 777 and is continuous from around the aperture 779. The first piece 756 may include a female end 761 formed by a receiving aperture 775. In some examples, as shown in FIG. 14, the outer layer 704 may not extend about the male end 760 of the second piece 758, such that the male end is formed as part of the main body 702.

In some examples, the male end 760 forms a press fit with female end 761. In some examples, the apparatus 700 includes alignment features for the first piece 756 and second piece 758. The male end may include a ridge or keyed feature that may engage with a groove or interlocking structure of the female end 761. For example, the collar 781 may be keyed or shaped, with the receiving aperture 775 forming a complementary keyway or shape so that the first piece 756 and second piece 758 may be assembled in a specific orientation or so that a specific surface feature may be aligned or visible when the smoking apparatus is used.

In some examples, the male end 760 may be threaded and be threadably engaged with grooved or threaded female end 761.

To assemble the pipe 700 for use, the male end 760 may be inserted into the first piece 756 to create the smoking apparatus assembly 700. As shown in FIGS. 13 and 14, the smoking apparatus 700 may be separated into two pieces at the juncture between the bulbous proximal end and the stem. The smoking apparatus may be separable in other portions of the structure, such as mid-way along the stem. In some examples, the smoking apparatus may be separable into more than 2 pieces.

Figure 15:
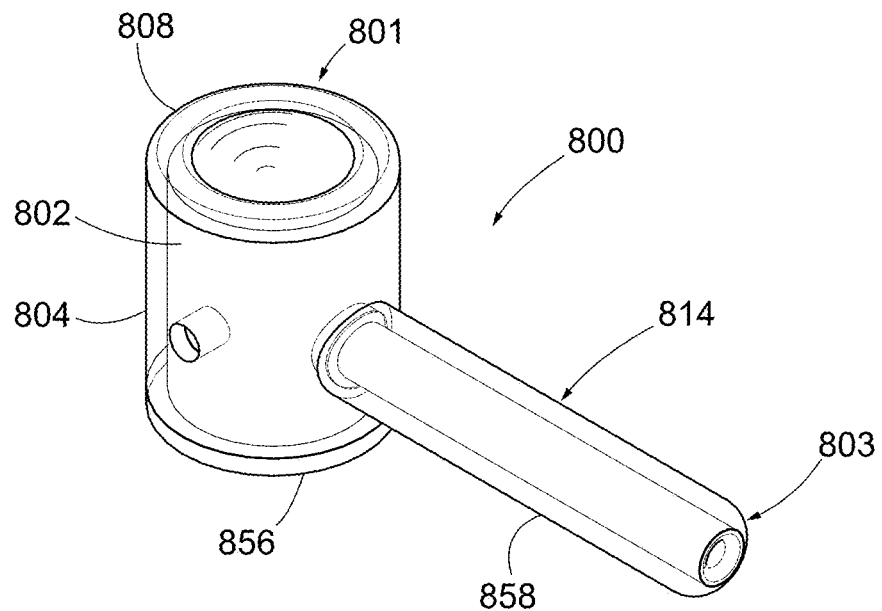
FIG. 15 shows a perspective view of a smoking apparatus in accordance with an example.
Figure 16:
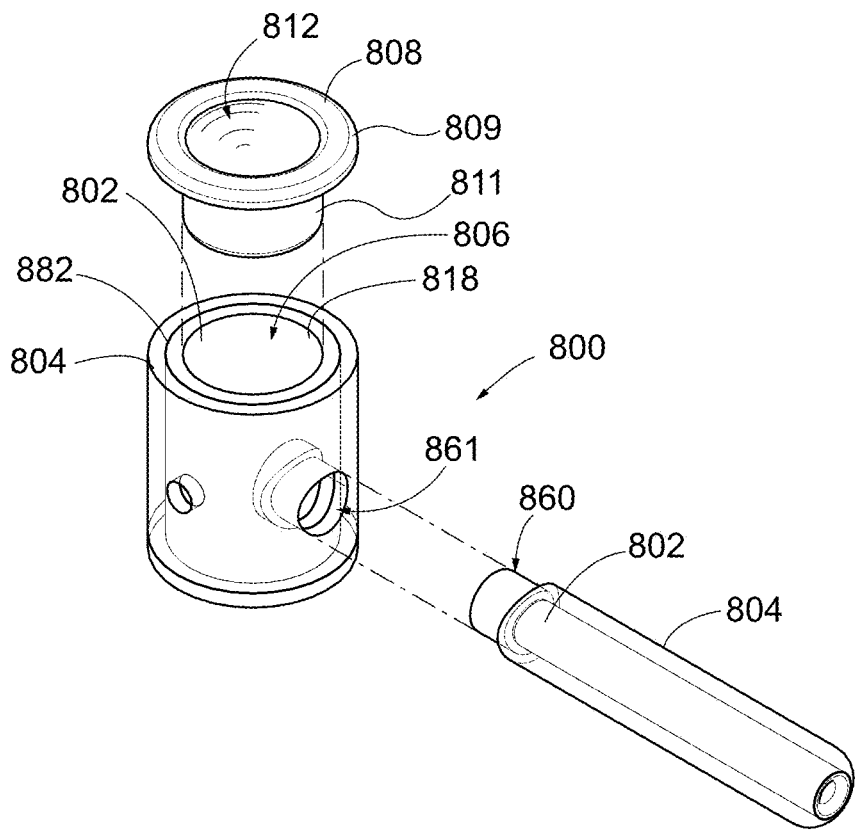
FIG. 16 shows a partially exploded view of the smoking apparatus of FIG. 15.

FIG. 15 shows a perspective view of a smoking apparatus 800 in accordance with one example. FIG. 16 shows a partially exploded view of the smoking apparatus 800 of FIG. 15. The smoking apparatus 800 may include features similar to previously described smoking apparatus examples with a main body 802 with an outer layer 804 positioned over, molded over, or over molded onto at least a portion of the main body, and a receptacle 808. The use and operation of the smoking apparatus 800 may be similar to previously described smoking apparatuses, while the overall shape of the main body 802 and outer layer 804 may be different than previously discussed examples. The smoking apparatus 800 allows both the shape of the outer layer 804 and the main body 802 to be optically detected, while only the shape of the outer layer 804 is tactilely detectable.

The smoking apparatus 800 may include a first piece 856 and a second piece 858. Both the first piece 856 and second piece 858 may be cylindrically shaped, but with different diameters and lengths. Similar to the smoking apparatus 700, the second piece 858 may include a male end 860 formed as part of the main body 802, and the outer layer 804 does not extend about the main body 802 at the male end 860. The male end 860 may be inserted into a female end 861 formed in the first piece 856 to assemble the pipe. In some examples, the engagement of the male end 860 and female end 861 forms a press fit with the first piece. In other examples, the male end may include a ridge, thread, and/or key that may engage with a groove, threaded or interlocking structure of the female end 861 of the first piece. In some examples, the first piece 856 may include a male end and the second piece 858 may include a female end.

As shown in FIG. 16, the first piece 856 of the smoking apparatus 800 may include a combustion chamber 806, with an upper surface 882 formed by both the outer layer 804 and the main body 802. An aperture 818 may be formed by the main body 802 at the upper surface, the aperture forming an opening to the combustion chamber.

The smoking apparatus 800 may also include the receptacle 808. The receptacle 808 includes a lip 809 and body 811 with an aperture located at the bottom of the body 811. The receptacle may form an ignition region 812, and a smoking product may be positioned within the receptacle. The receptacle may be positioned within an upper region of the combustion chamber, with the lip 809 in an abutment arrangement about the upper surface 882 of the smoking apparatus. The body 811 of the receptacle may contact or be adjacent to the main body 802 forming the combustion chamber.

Figure 17:
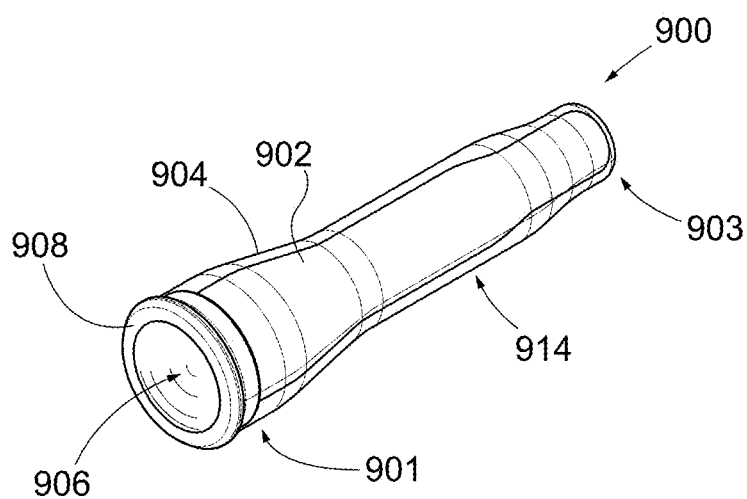
FIG. 17 shows a perspective view of a smoking apparatus in accordance with an example.
Figure 18:
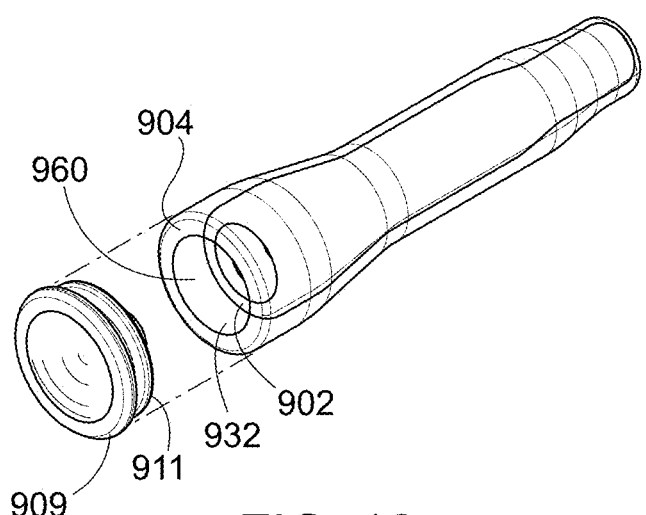
FIG. 18 shows a partially exploded view of the smoking apparatus of FIG. 17.

FIG. 17 shows a perspective view of a smoking apparatus 900 in accordance with an example. FIG. 18 shows a partially exploded view of the smoking apparatus of FIG. 17. The smoking apparatus 900 includes a proximal end 901, a stem 914, and a terminal end 903. The smoking apparatus includes a main body 902 and an outer layer 904 and a receptacle 908. The proximal end includes a combustion chamber 906. In the smoking apparatus 900, the stem and terminal end are linearly disposed with the combustion chamber. The receptacle 908 may form at least part of the combustion chamber 906. Similar to previously described smoking apparatuses, the outer layer 904 is generally shaped similar to the main body 902, but may have a thickness that varies in portions. The smoking apparatus 900 allows both the shape of the outer layer 904 and the main body 902 to be optically detected, while only the shape of the outer layer 904 is tactilely detectable. In use, combusted smoke may be drawn through the smoking apparatus from the combustion chamber in the proximal end, through the stem, and exit at a mouthpiece at the terminal end.

The proximal end 901 of the smoking apparatus may include a recess 932 formed by the outer layer 904 and the main body 902. The outer layer may extend past the main body 902, forming a collar 960 in which the receptacle may be partially positioned within. Similar to the receptacle 808 of FIGS. 14 and 15, the receptacle 908 may include a lip 909 and body 911 with an aperture located at the bottom of the body 911. When assembled, the lip 909 may be positioned to abut the end 901 formed by outer layer 804, and may serve to protect that area of the outer layer.

Figure 19:
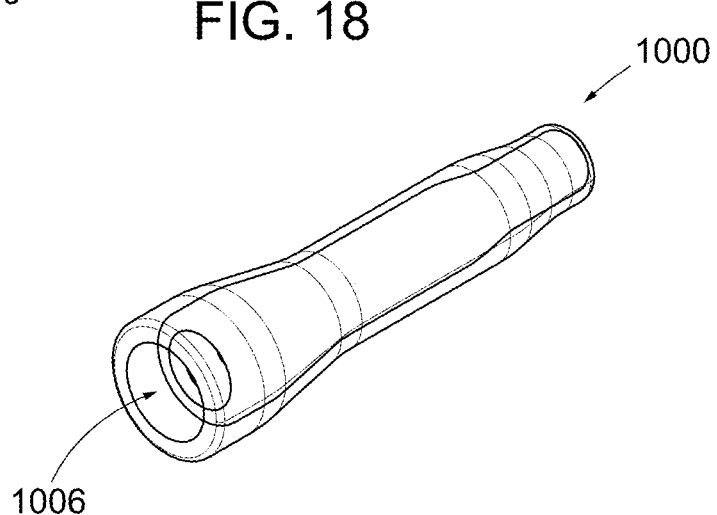
FIG. 19 shows a perspective view of a smoking apparatus in accordance with an example.

FIG. 19 shows a perspective view of a smoking apparatus 1000 similar to the smoking apparatus 900, except that the combustion chamber 1006 is not formed at least partially using a separable receptacle.

Figure 20:
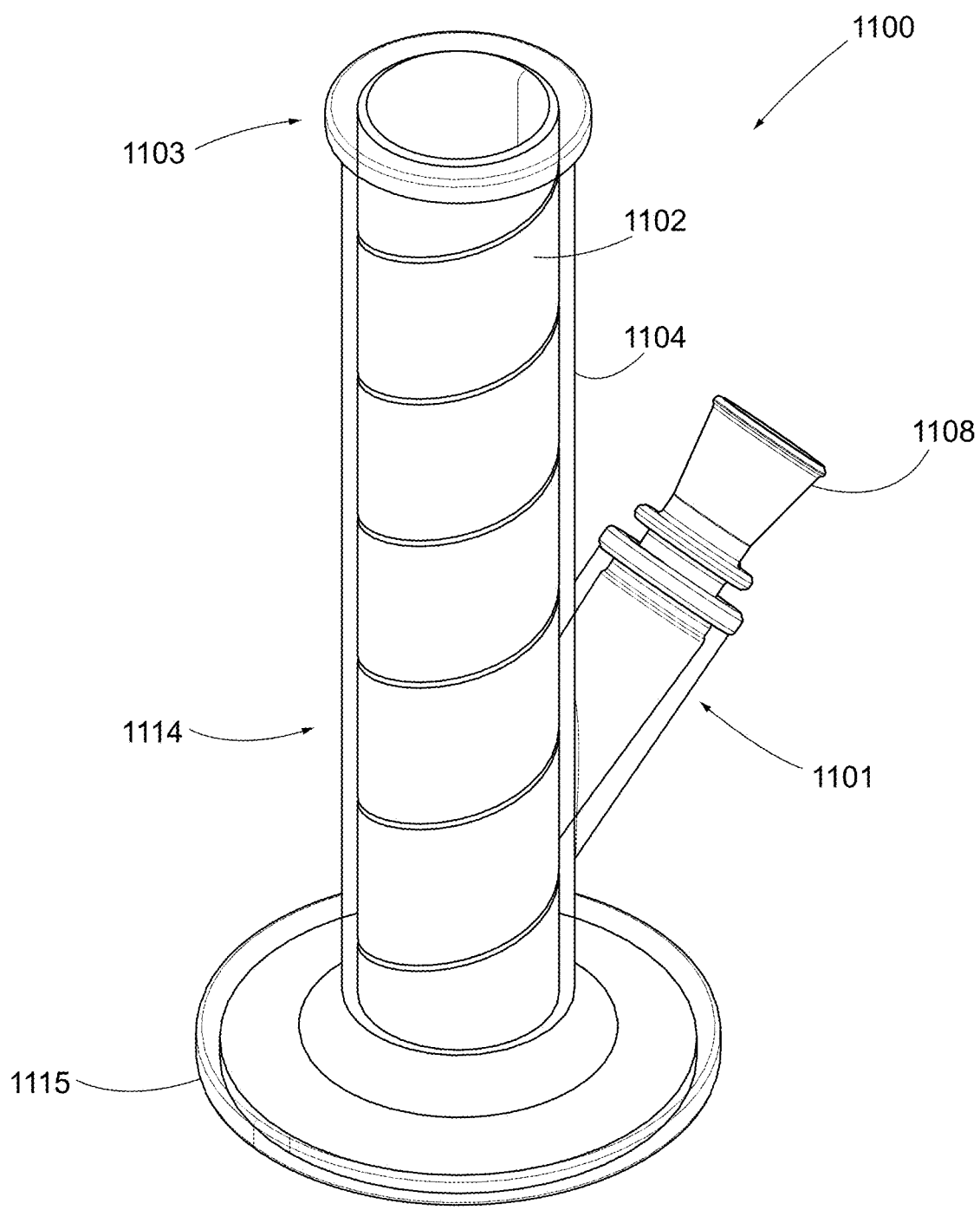
FIG. 20 shows a perspective view of a smoking apparatus in accordance with an example.
Figure 21:
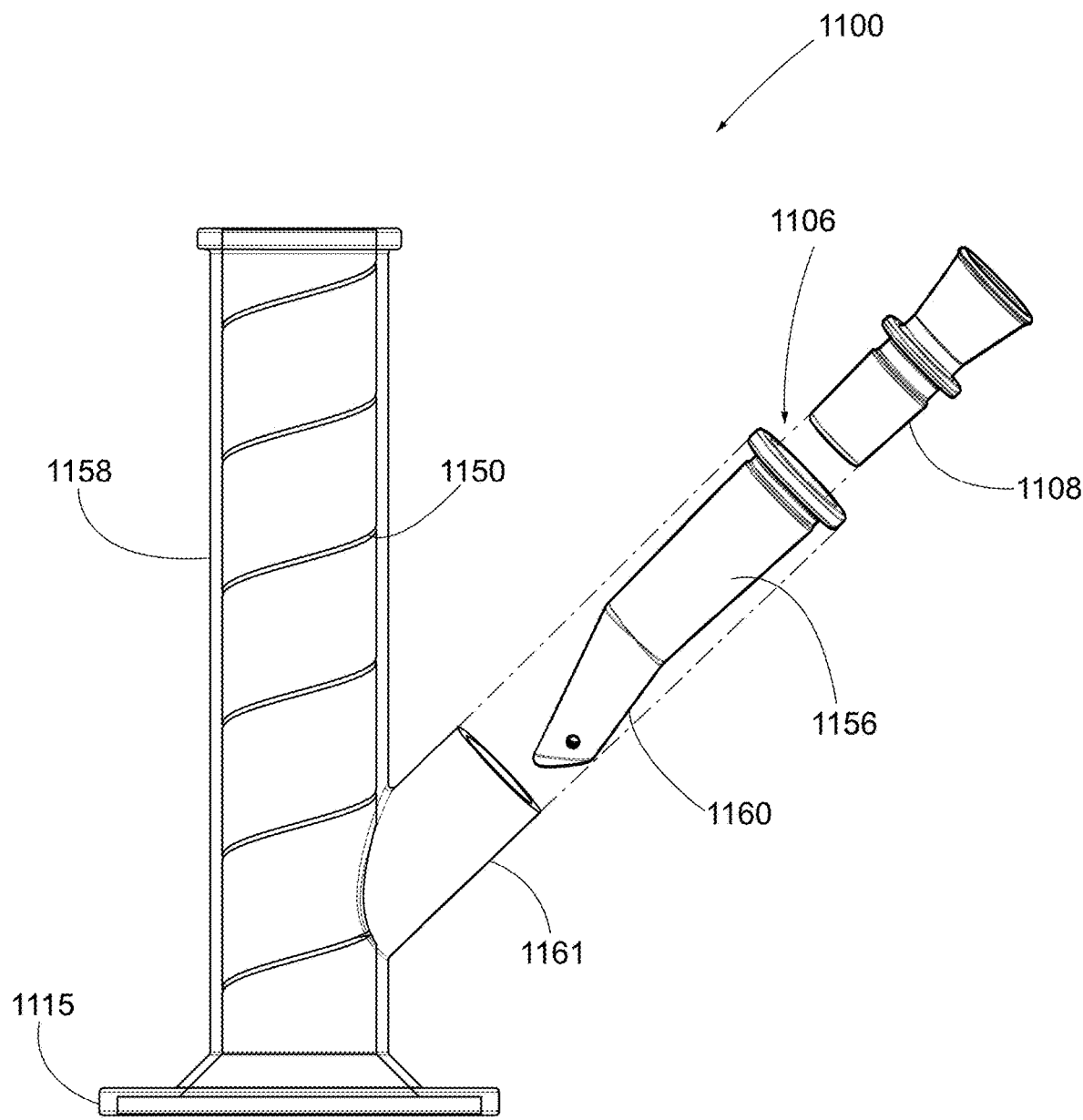
FIG. 21 shows a partially exploded view of the smoking apparatus of FIG. 20.

FIG. 20 shows a perspective view of a smoking apparatus 1100 in accordance with one example. FIG. 21 shows a partially exploded view of the smoking apparatus 1100 of FIG. 20. The smoking apparatus 1100 may include features similar to previously disclosed smoking apparatus examples, with a proximal end 1101, stem 1114, and terminal end 1103. The apparatus may also include a stand 1115 formed adjacent the stem 1114 to help stabilize the smoking apparatus such that it could be rested on a table or surface. The apparatus 1100 includes a main body 1102 at least partially surrounded with an outer layer 1104, and a receptacle 1108. The receptacle 1108 may be positioned within a combustion chamber 1106. The combustion chamber is fluidly coupled with a lumen extending through the stem with an outlet in the terminal end.

The smoking apparatus 1100 may include a first piece 1156, including the combustion chamber 1106, and a second piece 1158, including the stem 1114 and terminal end 1103. The first piece 1156 may include a male end 1160 configured to engage with a female end 1161 formed in the second piece 1158. In some examples, the female end 1161 may be formed by only the outer layer 1104, and the male end is formed as part of the main body.

To use, the male end 1160 of the first piece 1156 may be inserted at least partially within the female end 1161 of the second piece 1158, and the receptacle 1108 may then be inserted into or coupled with the combustion chamber 1106 of the first piece 1156. The first piece 1156 may engage with the female end 1161 via a press or compression fit, or may be threaded and threadably engage with the female end 1161. In some examples, the stem 1114 may be filled with or include a mixture of gas and liquid, such as water or water mixed with other liquids.

The smoking apparatus 1100 may also include a decorative feature 1150, such as raised or indented features which may be in the form of a ridge, groove, raised or engraved text or a symbol that is formed integral with the main body 1102 or that may be positioned with or attached to the main body 1102 prior to the outer layer 1104 being applied.

In some examples, the described smoking apparatuses, such as smoking apparatus 100, 200, 300, 400, 500, 600, 700, 800, 900, 1000, 1100, 1200, 1300, 1400, 1500, 1600, may be formed using an insert molding or overmolding process. A method for forming a smoking apparatus may include forming a main body 102 with a conduit or lumen 127 extending through the main body 102 between a combustion chamber 106 and a mouthpiece 110, and positioning, molding, or overmolding a second material onto or about at least a portion of the main body 102 wherein the second material forms an outer layer 104.

In some examples, overmolding is an injection molding process that allows an additional layer of resin to be added to an existing molded part to provide a combination of characteristics that a single material may not provide. In some examples, an overmolding process may be used to add a soft, functional, "hand-friendly" layer of rubber-like material, such as a thermoplastic elastomer over the main body, such as when is formed of a hard or a soft substrate. An example of a hard substrate is ceramic, glass, wood or metal and an example of a soft substrate is a rubber-like material, thermoplastic elastomer, lower-density foam, cloth, or rope. In some examples, overmolding may be used to change or enhance the appearance of a part by overmolding material of a different color or finish to it.

Like overmolding, insert molding injects a resin over a first material, but instead of a plastic substrate, the first material may typically be metal and the injected resin is typically a rigid plastic. In some examples, metal electrical components or custom-machined metal parts may be embedded in plastic using an insert molding process. Similarly, threaded inserts in the smoking apparatus can be molded into plastic parts for stronger, more durable assembly of plastic components, for example a separable, decorative feature that may assembled to and separated from the smoking apparatus. In some examples, insert molding may be an alternative to inserting metal parts by either heat staking or ultrasonic welding, processes by which a molded plastic part is locally melted to allow the insertion of a metal part. In some examples, insert molding may be more controllable and allow for better or improved encapsulation than the other methods. Molded inserts may also eliminate the need for a secondary insert installation process.

The main body 102 may be formed of a variety of materials, including any one or a combination of silicone rubber, glass, wood, metal, fiber, plastic, cloth, ceramic, quartz, and/or stone. The main body 102 is formed to include the gas pathway, or a hollow lumen 127 that extends between the combustion chamber 106 and the mouthpiece 110 formed in the terminal end 103 of the smoking apparatus 100. Once the main body 102 is formed, it may be positioned within an injection molding tool. The tool may be designed to create a shaped outer layer 104 or outer body that may be similar to or different than the shape of the main body. In some examples, decorative features, such as ridge 250 of FIG. 8, decorative elements 352 of FIG. 9, raised or indented feature 450 of FIG. 10, may be formed in the outer surface 183 of the main body 102 or coupled to the outer surface 183 of the main body 102 prior to being inserted into the tool. Once the main body 102 is positioned within the tool, the material forming the outer layer 104, such as a 100% optically clear silicone rubber, may be injected into the tool. The injected material surrounds the main body 102 based upon the design of the tool. Once the material forming the outer layer 104 has cured or solidified, the main body 102 and outer layer 104, and any decorative features included, become joined together to form a single part.

In some examples, the smoking apparatuses disclosed herein, such as smoking apparatus 100, 200, 300, 400, 500, 600, 700, 800, 900, 1000, 1100, 1200, 1300, 1400, 1500, 1600, may include features that assist in reducing the effects of oxidation. As shown in FIGS. 4A and 4B and 6-7, the main body 102 may extend to most or all openings and surfaces that may come in contact with airborne tars, contaminants, or heat from a type of ignition source when the smoking apparatus is used and/or when a product is combusted adjacent to or within the combustion chamber. The outer layer 104 surrounds the remaining portions of the main body 102. In some examples, the exposure of a typical smoking apparatus to heat or an ignition source at or near the combustion chamber 106 may contaminate, damage, or aesthetically mark the smoking apparatus. Similarly, the combusted gaseous product or smoke, which may include tar and other contaminants, may also temporarily or permanently contaminate or damage exposed surfaces at or around the apertures formed in the exterior of a typical smoking apparatus, such as the mouthpiece aperture 126 and vent aperture 128.

To help avoid this potential damage, the main body 102 may define the mouthpiece aperture 126, vent aperture 128, and at least a portion of the combustion chamber 106. As shown in FIG. 4A, the main body 102 includes a sidewall thickness SW1 and SW2 around the mouthpiece aperture 126 of the main body 102 at the terminal end 103. The thicknesses SW1, SW2 of the main body form a border about the aperture 126, and the outer layer 104 is positioned adjacent to the border. In this example, the main body 102 forms a rim 125 around the aperture 126, which has a width of approximately SW1 and SW2 (depending which portion is measured). The outer layer 104 is formed around the periphery of the sidewall thickness SW1 and SW2 about aperture 126 in the main body 102. In this manner, the outer layer 104 is spaced away from the aperture 126 to reduce the effect of the combusted product as it passes through the aperture 126. This configuration may help to allow the combusted product drawn through the smoking apparatus to exit at the aperture 126 without contacting the surrounding over layer. The rim may have an annular shape having a constant width dimension (SW1=SW2), or a varying width dimension, or the rim may have a different shape. The rim may be continuous around the aperture 126, or discontinuous.

Similar, as shown in FIG. 7, the proximal end 101 includes a sidewall thickness SW3 and SW4 formed by the main body 102 around the vent aperture 128, forming a border around the aperture 128. In this example, the main body 102 forms a rim 119 around the aperture 128, which has a width of approximately SW3 and SW4 (depending which portion is measured). The outer layer 104 is formed around the border, at a distance of SW3 and SW4, of the aperture 128 in the main body 102. In this manner, the outer layer 104 is spaced away from the aperture 128 to reduce the effect of the combusted product as it passes through the aperture 128. In use, a user could choose to cover the vent aperture 128 or leave the vent aperture uncovered when drawing combusted product through the combustion chamber 106. This configuration may help to shield the surrounding outer layer 104 from contact with the potential combusted product that may flow through lumen 129 and exit the apparatus via vent aperture 128. These sidewall thickness SW3 and SW4 may help ensure that combusted gaseous product or smoke only contact or be exposed to the main body 102. The rim 119 may have an annular shape having a constant width dimension (SW3=SW4), or a varying width dimension, or the rim 119 may have a different shape. The rim 119 may be continuous around the aperture 128, or discontinuous. The rim structure around an aperture, such as rim 125 and/or rim 119, is optional and may not be implemented or present on a product configuration.

Similarly, as shown in FIGS. 4A and 6, in some examples, the receptacle 108 includes a rim or lip 109 that overlaps a portion of the recess 132 formed by the outer layer 104. The lip 109 of the receptacle may further protect the outer layer 104 at that location from damage from an ignition source and/or the combustion of the smoking product positioned in the ignition region of the combustion chamber. Similarly, the position of the receptacle 808 in FIGS. 15 and 16, and receptacle 908 of FIGS. 17 and 18, may also help to protect the outer layers 804, 904 of the proximal ends 801, 901 from this type of damage. In these examples, the position of the receptacle 108 when assembled to the proximal end 101 may help shield the outer layer 104 at the proximal end from damage from heat of a product combusted in the receptacle 108, as well as help shield the outer layer 104 from contact with combusted product as it is drawn through the smoking apparatus 100. Furthermore, with regard to FIGS. 15 and 16, the male end 860 formed as part of the main body 802 may also help to shield the outer layer 804 near the junction of the first piece 856 and the second piece 858 from contact with the smoke or combusted product as it is drawn from the combustion chamber and through the stem 814 to the terminal end 803.

In some examples, the combustion chamber 106 does not include a receptacle, such as shown in FIGS. 5 and 19. In some examples, the smoking product 99 may be positioned within the main body's combustion chamber 1006, 1206 without contacting or minimizing contact to the outer layer 104.

In some examples, the main body 102 may be formed using a colored and/or opaque silicone rubber, which may help to mask the effects of the heat damage and contaminants. The position of the outer layer 104 with respect to the main body 102, such that in some examples it terminates at a distance away from the apertures 126, 128 formed on the main body 102, may help to shield the outer layer 104 and prevent the heat or damaging smoke from contacting the outer layer 104 while providing a durable outer layer or covering for the smoking apparatus. In some examples, the additional oxidation protection of the outer layer 104 may also provide a user a way to view a visually interesting main body 102, formed of a material that may more easily hide or mask any discoloration or damage from use.

Figure 22:
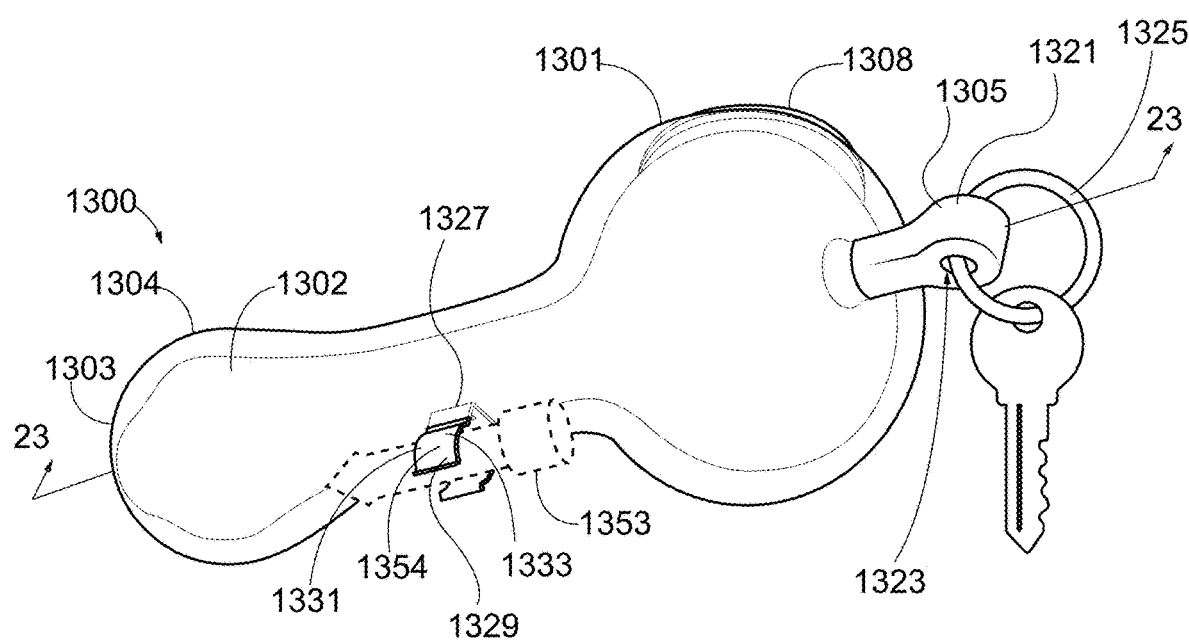
FIG. 22 shows a perspective view of a smoking apparatus in accordance with an example.
Figure 23:
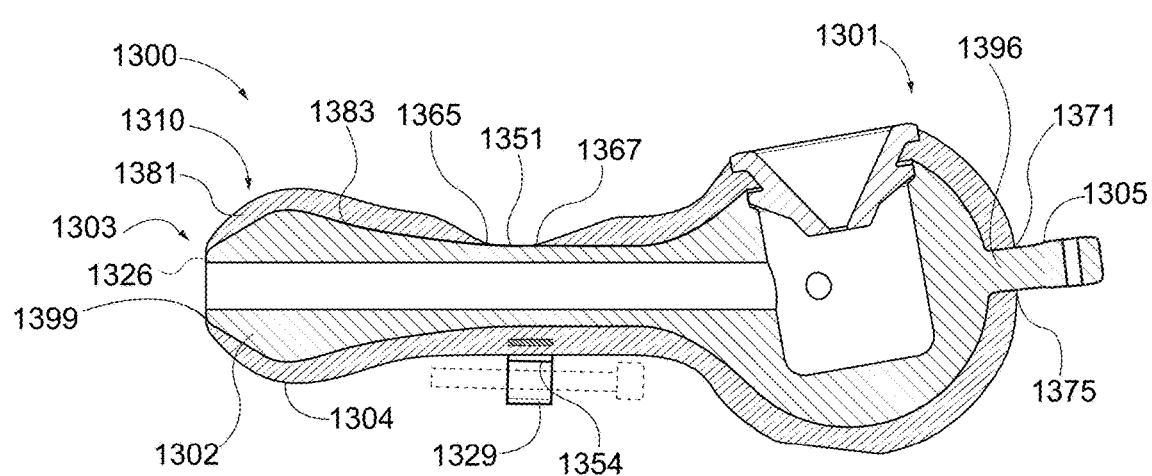
FIG. 23 shows a cross-sectional view along line 23-23 of the smoking apparatus of FIG. 22.
Figure 24:
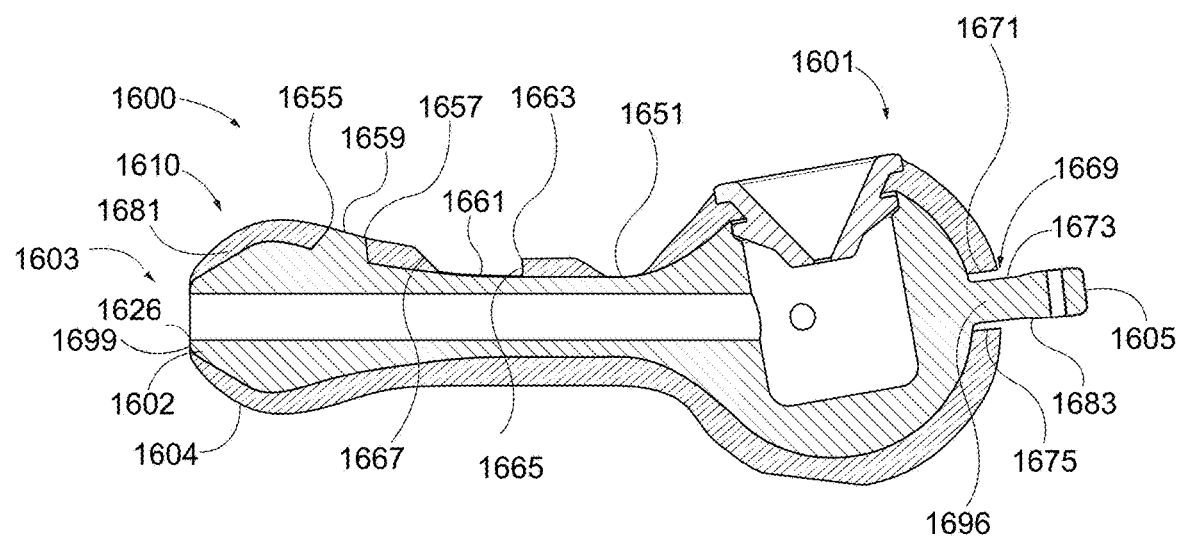
FIG. 24 shows a cross-sectional schematic view of a smoking apparatus in accordance with an example.

FIG. 22 shows a perspective view of a smoking apparatus 1300 in accordance with an example, with FIG. 23 a cross-sectional view of the apparatus 1300 of FIG. 23. FIG. 24 is a cross-sectional schematic view of a smoking apparatus 1600 in accordance with an example.

The smoking apparatus 1300, 1600 includes features that may be similar to those of the smoking apparatus 100, for example the main body 1302, 1602 and the outer layer 1304, 1604. As shown in the embodiments of FIGS. 22-24, the outer layer 1304, 1604 may be a layer that at least partially covers various portions or segments of the main body 1302, 1602 and as shown here, may encapsulate various portions or segments, or substantially the entirety, of the main body 1302, 1602. In some examples, the main body 1302, 1602 may be exposed through the outer layer 1304, 1604, such as at or near the proximal end 1301, 1601 where the receptacle may be positioned, or at the mouthpiece 1310, 1610 at terminal end 1303, 1603. For example, the mouthpiece 1310, 1610 includes an exposed portion 1399, 1699 of the main body 1302, 1602 formed around aperture 1326, 1626.

In some examples, each portion of the main body 1302, 1602 not covered by the outer layer 1304, 1604 defines an exposed portion with an exposed surface. The outer layer 1304, 1604 adjacent the exposed surfaces defines an edge that at least in part defines the shape and/or extent of the exposed portion. For example, in FIG. 24 the edges 1655, 1657 are generally flush with exposed portion 1659 of the main body 1602. The exposed portion 1659 of the main body 1602 may protrude to be flush with the outer surface 1681 of the outer layer 1604. The sidewalls of the exposed portion 1659 may be normal to the surface of the outer layer, or be angled towards or away from each other to create different shaped exposed portions having desired sidewall profiles.

In some examples, the main body 1302, 1602 protrudes through and past the outer surface of the outer layer 1304, 1604, such as at post 1305, 1605. In some examples, the post 1305 may have an aperture 1323 formed at or near a free end 1321. The aperture may receive a key ring 1325, lanyard string, chain, charm or the like. In FIG. 23, the outer layer 1304 may surround and contact the post 1305 at sidewalls 1371, 1375. The sidewalls 1371, 1375 formed by the outer surface of the outer layer 1604 engage around at least a portion, such as base 1396 of protrusion 1305 as it extends past the outer surface 1381 of the outer layer 1304. Alternatively, as shown in FIG. 24, the sidewalls 1671, 1675 may be spaced away from the base 1696 of the protrusion 1605, thereby forming a gap 1669 extending from the outer surface 1681 of the outer layer 1604 to the outer surface 1683 of the main body 1602. The gap may extend at least partially around the base 1696, or may extend entirely around the base 1696 to form an annular gap, such as gap 1669. As shown in FIG. 24, near the proximal end 1601, the outer layer 1604 forms sidewall 1671. The gap 1669 is formed by sidewall 1671 and outer surface 1683 of the base 1696 of protrusion 1305.

In some examples, such as at recessed portion 1661 of FIG. 24, the main body 1602 may be recessed from the outer surface 1681 of the outer layer 1604. For example, the outer layer 1604 may include exposed sidewalls 1665, 1667 that are the thickness of the outer layer 1604. The sidewalls 1665, 1667 extend down to the meet the outer surface 1683 of the main body 1602 at recessed portion 1661. The sidewalls 1665, 1667 form at least a part of the periphery of the shape of the recessed portion 1661. In some examples, the sidewall may be substantially normal to the outer surface 1683 of the main body, such as forming a shoulder as sidewall 1665. In some examples, the sidewall may be angled towards or away from the outer surface 1683 of the main body 1602, and such as sidewall 1667. The configuration of the sidewalls may create a texture, grip, or an aesthetic or decorative feature, etc.

In some examples, the main body 1302 is exposed at an area where the outer layer 1304 thickness decreases, becoming gradually thinner until the outer layer 1304 does not cover the main body 1302, such as region 1351 of FIG. 23. For example, the edges 1365, 1367 of the outer layer 1304 meet the main body 1302 and define at least a portion of the shape of the exposed portion 1351 of main body in FIG. 23. Similarly, the portion 1651 of the main body of FIG. 24 is exposed. In some examples, the shape of the outer layer 1304, 1604 as it surrounds exposed portions of the main body 1302, 1602 may include benefits such as creating a grip between the outer layer and main body. In some examples, the transition between the outer layer and the main body at the exposed portions is smooth to help prevent snagging. In some examples, as edge of the exposed region or portion may have a gradual, angled slope, such as at 1667. In some examples, the edge of the exposed portion may form a shoulder, such as at 1665.

As shown in FIGS. 22 and 23, in some examples, the smoking apparatus 1300 includes a clasp 1354 to adjustably or releasably hold a component, such as a tool 1353 that may be utilized when the smoking apparatus is used, or to help clean or protect the smoking apparatus when not in use. In some examples, as in FIG. 22, the clasp 1354 is U-shaped piece of metal or plastic defining a base 1327 and two opposing arms 1331. The arms 1331 are spaced apart, but may be resiliently biased towards one another. Each arm may be outwardly curved so that the free end 1329 of each arm 1331 are closer together than a central portion 1333 of the arms. The clasp 1354 is positioned on the smoking apparatus 1300 and provides a convenient way to releasably receive a tool 1353 for storage. The tool 1353, such as a tamper, is received in the clasp by positioning a portion of the tamper through the space between the arms, which causes the arms to bias outwardly to allow the portion of the tamper to seat between the outwardly curved central portions 1333 of the arms 1331.

The clasp may be secured to the smoking apparatus in a number of ways, such as by being fastened directly to the main body. The clasp could be encapsulated in the main body as well. Alternatively, as shown in FIG. 22, the base 1327 of the clasp, and in some examples, possibly a lower portion of each of the arms 1331, are encapsulated in the outer layer 1304.

In some examples, the clasp 1354 contacts the main body 1302. In some examples, the clasp 1354 may be integrally formed with the main body 1302 such that the resilient arm may be an extension of the main body. In some examples, the clasp 1354 is attached or coupled to the main body 1302 by a fastener. In some examples, the clasp 1354 does not contact the main body 1302 but is secured to the smoking apparatus by the outer layer 1304 and held in position.

Figure 25:
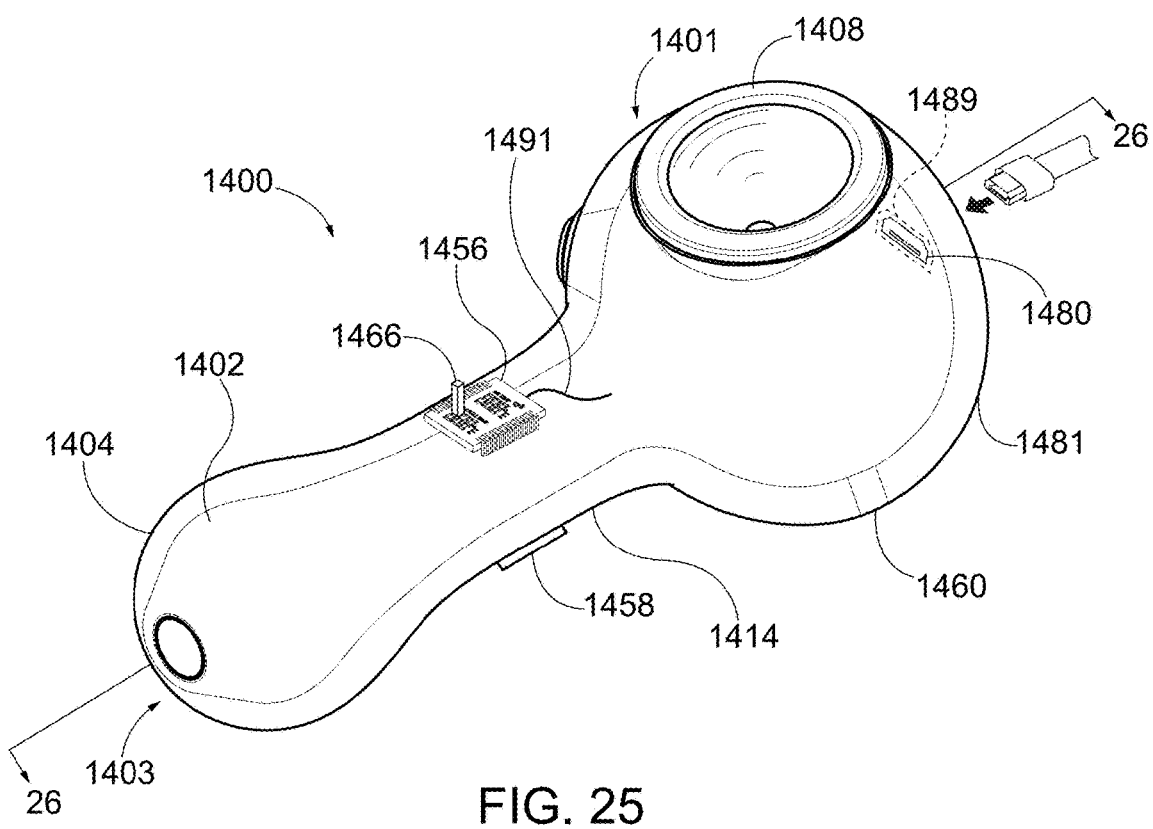
FIG. 25 shows a perspective view of a smoking apparatus in accordance with an example.
Figure 26:
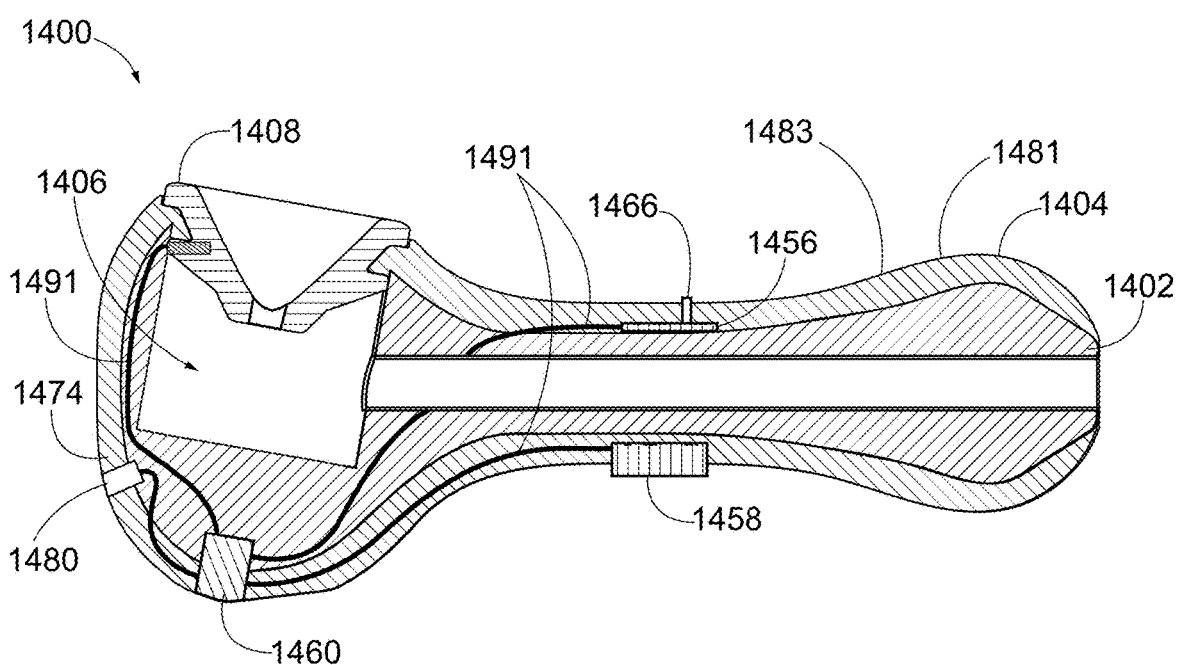
FIG. 26 shows a cross-sectional view along line 24-24 of the smoking apparatus of FIG. 23.

FIGS. 25 and 26 show a smoking apparatus 1400 in accordance with an example. FIG. 25 is a perspective view of the smoking apparatus 1400, and FIG. 26 is a cross-sectional along line 26-26 of FIG. 25. The smoking apparatus 1400 includes features that may be similar to those of the previously described smoking apparatuses, such as a main body 1402 and an outer layer 1404. Smoking apparatus 1400 includes a proximal end 1401, a terminal end 1403, and a receptacle 1408. The receptacle may be separable or integrally formed with the smoking apparatus 1400. In this example, the smoking apparatus may include at least one electrical component, such as a display, light, heating element, computing device, communication device, PCB, power source, or the like.

As shown in FIG. 25, the smoking apparatus 1400 includes a display 1456. The display may be an output device for the presentation or communication of visual information. For example, the display could be an electronic screen, light emitting diode (LED) or a combination thereof. The display 1456 may be entirely encapsulated by the outer layer 1404. In some examples, the display may be at least partially exposed through the outer surface 1481 of the outer layer 1404, as shown in FIG. 25. In some examples, the display 1456 may contact the main body 1402, as shown in FIG. 25 or it may not contact the main body 1402. In the example of FIGS. 25 and 26, the display 1456 is positioned along the stem 1414 of the smoking apparatus 1400.

The smoking apparatus 1400 may include multiple displays, such as second display 1458. The second display 1458 may be entirely encapsulated by the outer layer 1404, be at least partially exposed, or extend at least partially past the outer surface of the outer layer 1404 as shown in FIG. 26. In some examples, the display 1456 may be entirely encapsulated by the outer layer 1404, be at least partially exposed, or extend at least partially past the outer surface of the outer layer 1404. In some examples, the display may be positioned at or near the proximal end 1401, at or near the terminal end 1403, or positioned at a location between the ends of the apparatus.

In some examples, one or both of the displays 1456, 1458 is an LED feature. The LED feature may include a plurality of lights for communicating, an accessory feature, or both. The LED feature may flash or blink in certain patterns based upon an operating status of the smoking apparatus or its electrical subcomponents. The display may include decorative features or patterns formed by the LED or by features separate from the LED. The display may visually communicate information about the operating status of the apparatus or device. In some examples, the display(s) 1456, 1458 may be formed as part of a computing device.

The displays 1456, 1458 may be electrically coupled, for example via wires 1491, to a power source 1460. The power source 1460 may include a battery. The battery may be a permanent, replaceable, and/or rechargeable battery. The power source 1460 may be positioned to be exposed through the outer surface 1481 of the outer layer 1404, as shown in FIG. 26. In some examples, the position of the power source 1460 allows for the connection of an external charging source. In some examples, the power source may be positioned at a location where the main body 1402 is exposed through the outer layer, and the power source is exposed or accessible through the main body. In examples where the power source is accessible, the power source may be a single use battery that could be replaced by a user or the source may be a rechargeable battery. In some examples, the power source may be charged from an external power source, via a wired or wireless charging system. As shown in FIGS. 25 and 26, the battery 1460 may be electrically coupled to an electrical charging port 1480. An inlet to the electrical port may be accessible through an outer surface 1481 of the smoking apparatus. The electrical port may include a configuration to allow for electrical charging of the battery via a universal serial bus (USB), mini-USB, micro-USB, etc. or other type of charging port technology from an external power source.

In some examples, the user may input or upload information to or output data or download information from the apparatus. In some examples, the charging port may be blocked or protected by a cover movable 1489 from an open position to a closed position. This may prevent debris from entering the charging port.

As shown in FIG. 26, in some examples, the smoking apparatus may include a heating element 1482. The heating element 1482 may be positioned within a lower part of the combustion chamber 1406 to heat or combust smoking product positioned in the receptacle. In examples where the smoking apparatus does not include a separate receptacle (for example, see FIG. 5), the heating element may heat the combustion chamber and combust the product within the combustion chamber. In some examples, the heating element may be operated by the input element 1466 or display 1456, 1458. In some examples, the display may show information about the status or operation of the heating element. The heating element is electrically coupled to the battery 1460 or line power. In some examples, the smoking apparatus may include a temperature sensor 1474 to sense temperature information of the heating element 1482, record temperature information, and/or provide feedback through the system to regulate the temperature of the heating element or combustion chamber. The sensor may or may not be formed as part of the heating element. In some examples, the sensor may monitor initial combustion and then turn off.

Electrical wires 1491 may separately, or in combination, couple the displays 1456, 1458, heating element 1482, charging port 1480, sensor 1474, and power source 1460. These components may be used individually and are not required to be used together. The wires may be positioned adjacent an outer surface 1481 of the outer layer 1404, be embedded within or extend through the outer layer, be positioned adjacent to an outer surface of the main body 1402, contact or be attached to the main body, or be embedded within or extend through the main body, or combinations thereof. In some examples, where the outer layer is at least partially transparent, the wires connecting various electrical components of the smoking apparatus may be visible.

Figure 27:
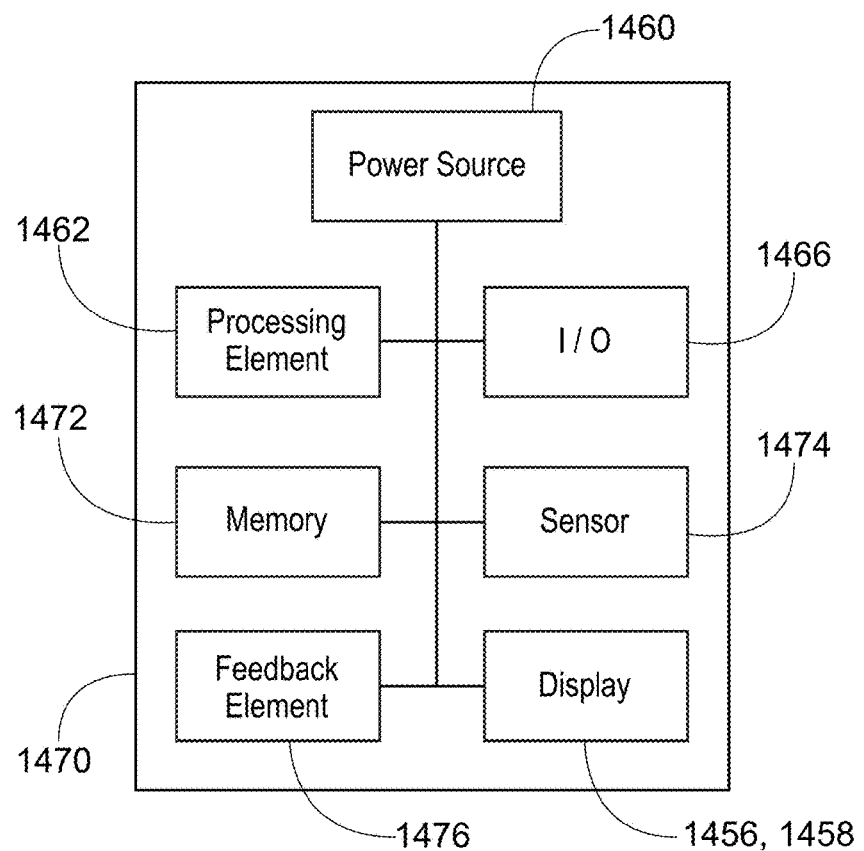
FIG. 27 shows a simplified block diagram of the smoking apparatus in accordance with an example.

FIG. 27 shows a simplified block diagram of the control system used in smoking apparatus in accordance with an example. In some examples, the smoking apparatus 1400 includes a computing device 1470, which may include one or more processing elements 1462, one or more memory components 1472, a power source 1460, once or more displays 1456, 1458, one or more input/output (I/O) interfaces 1466, and one or more feedback elements 1476. The computing device may also include other components generally found in computing systems, such as communication interfaces and one or more sensors, among others.

In some examples, the displays 1456, 1458 are electrically coupled to a processing element 1462, such as a programmable logic controller (PLC), and a memory device 1464 so that the displays may be controlled to send and/or receive information regarding the status and/or operation of the smoking apparatus. The memory device may store programming information regarding the displays or operation instructions or performance history of the apparatus.

In some examples, the displays include an I/O interface 1466, such as an input element, which may be coupled to send information to the processing element and control certain aspects of the smoking apparatus 1400. For example, the displays could include a touch screen input element. In these examples, a portion of the display may be exposed outside of the outer layer and main body. In some examples, the input element 1466 is separate from the display, such as a button in FIG. 26, such that the display 1456 may be encapsulated but the button 1466 is exposed. In some examples, the button is encapsulated by the outer layer but may still be operable via a physical touch, such as if a user squeezes or applies force to the button to engage it.

In some examples, the I/O interface may include a communication interface (such as Wi-Fi, Ethernet, Bluetooth, Bluetooth Low Energy chips, or the like) and communication components (such as a universal serial bus (USB), mini-USB, and micro-USB ports/cables). The communication interface may be operable to communicate, wired or wirelessly, with other external computing devices, such as a smartphone, tablet, service, or web-based cloud service.

In some examples, the charging port 1480 is also electrically coupled to the computing device 1470 of the smoking apparatus. This may allow a user to input or output information about the performance of the smoking apparatus or to control aspects of the smoking apparatus. For example, the user may be able to update various electrical configurations of the computing device by transferring software updates from an external source, such as a mobile phone, tablet, or laptop coupled to the smoking apparatus via a cord connected to the charging port or wirelessly via a Bluetooth or Wi-Fi connection. The user may also be able to download information, such as use time and performance, via the charging port.

Figure 28:
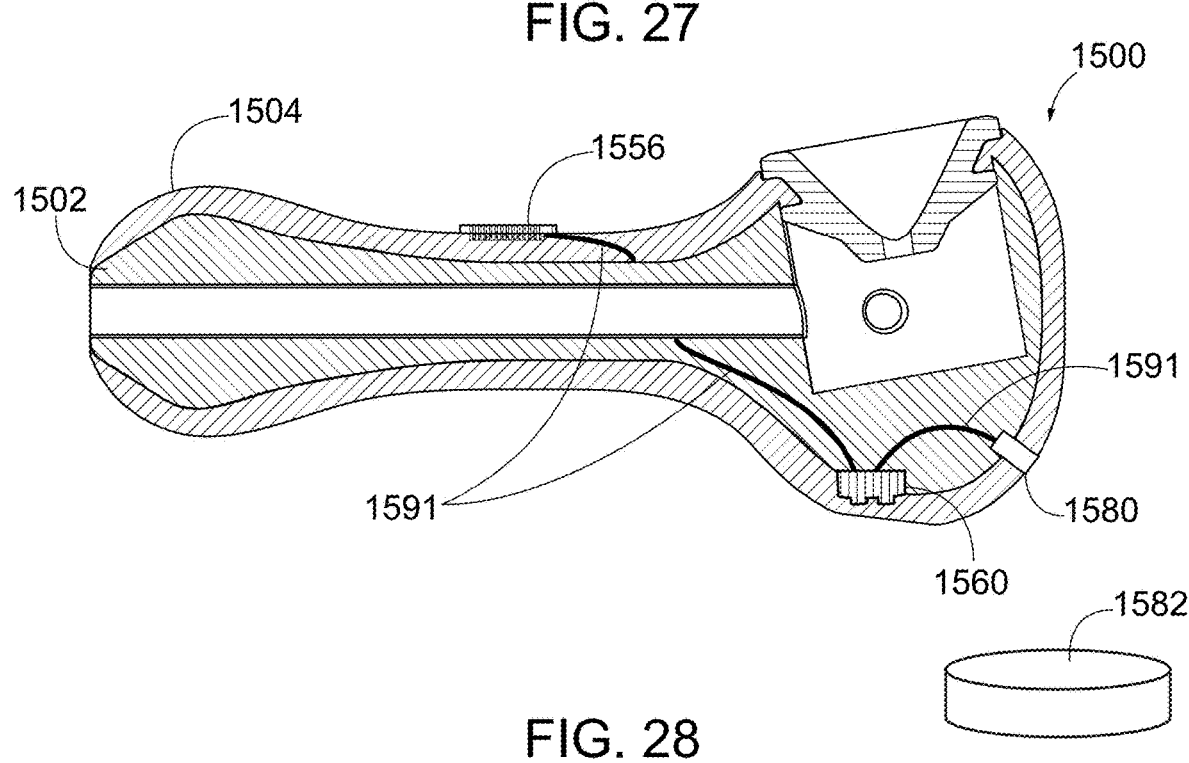
FIG. 28 shows a cross-sectional schematic view of a smoking apparatus in accordance with an example.

FIG. 28 shows a cross-sectional schematic view a smoking apparatus 1500 in accordance with an example. In some examples, the smoking apparatus 1500 may be similar to previously described smoking apparatus, such as smoking apparatus 1400. The smoking apparatus 1500 may include a main body 1502, outer layer 1504, a display 1556, a power source 1560, and a charging power 1580. In the example of FIG. 28, the display 1556 is positioned to at least partially extend past the outer surface of the outer layer 1504, and the power source 1560 is encased in the outer layer 1504 and main body 1502. Wires 1591 may connect the display 1556, power source 1560, and charging port 1580. In this example, the power source 1560 is a non-replaceable battery that may be charged via an external power source, such as via a power supplied via the charging port 1580 or wirelessly via an inductive charger 1582. The inductive charger 1582 may be Bluetooth configured to send to or receive information from the smoking apparatus.

Although the present invention has been described with a certain degree of particularity, it is understood the disclosure has been made by way of example, and changes in detail or structure may be made without departing from the spirit of the invention as defined in the appended claims.

What is claimed is:

1. A smoking apparatus comprising:
a main body of a first material including a combustion chamber fluidly coupled to an aperture of a mouthpiece, the main body having an outer shape;
an outer layer of a second material at least partially surrounding the main body, the second material having a deformable property;
wherein the outer layer is formed of an at least partially transparent material and the outer shape of the main body is at least partially visible through the outer layer; and
wherein the outer layer is non-separable from the main body.

2. The smoking apparatus of claim 1, further comprising a receptacle positioned at least partially within the combustion chamber, and wherein the receptacle shields the outer layer from contact with combustibles positioned within the receptacle.

3. The smoking apparatus of claim 1, wherein the outer layer continuously engages an outer surface of the main body where the outer layer covers the main body.

4. The smoking apparatus of claim 1, wherein at least one decorative feature is positioned on an outer surface of the main body, wherein the outer layer encapsulates the at least one decorative feature, and wherein at least a portion of the outer layer contacts the main body adjacent to the decorative feature.

5. The smoking apparatus of claim 1, wherein an outer surface of the outer layer has a shape that includes relief features that replicate surface features of the main body.

6. The smoking apparatus of claim 1, wherein the outer layer is secured to the main body by overmolding and forms a single part with the main body.

7. The smoking apparatus of claim 1, wherein the first material has an elastically deformable property.

8. A smoking apparatus comprising:
a main body with an outer surface and fluid pathway extending through the main body, the main body having an outer shape;

an outer layer at least partially covering at least a part of the outer surface of the main body; and wherein the outer layer is formed of an at least partially transparent material and the outer shape of the main body is at least partially visible through the outer layer; and the main body and the outer layer are joined together to form a single part.

9. The smoking apparatus of claim 8, further comprising a receptacle assembled to the main body and outer layer.

10. The smoking apparatus of claim 8, wherein an outer shape of the outer layer is substantially dissimilar to the outer shape of the main body.

11. The smoking apparatus of claim 8, wherein the main body further comprises at least one decorative feature defined on the outer surface of the main body, wherein the outer layer encapsulates the decorative feature, and wherein at least a portion of the outer layer contacts the main body adjacent to the decorative feature.

12. A smoking apparatus comprising:
a main body with an outer surface and fluid pathway extending through the main body, wherein the main body has an outer shape;
an outer layer at least partially molded about at least a part of the outer surface of the main body;
a power source configured to supply power to an electrical component, wherein the electrical component is configured to ignite a combustible material; and
wherein the outer layer is formed of an at least partially transparent material and the outer shape of the main body is at least partially visible through the outer layer.

13. The smoking apparatus of claim 8, wherein a power source is configured to supply power to an electrical component positioned within the main body or outer layer.

14. The smoking apparatus of claim 8, wherein the outer layer continuously engages the outer surface of the main body where the outer layer covers the main body.

15. A smoking apparatus comprising:
a main body of a first moldable material having a deformable property, and including a combustion chamber fluidly coupled to an aperture of a mouthpiece, the main body having an outer shape;
an outer layer of a second material at least partially surrounding the main body, the second material having a deformable property;
wherein the outer layer is formed of an at least partially transparent material and the outer shape of the main body is at least partially visible through the outer layer and wherein the outer layer is non-separable from the main body.

16. The smoking apparatus of claim 15, wherein at least one decorative feature is positioned on an outer surface of the main body, wherein the outer layer encapsulates the at least one decorative feature, and wherein at least a portion of the outer layer contacts the main body adjacent to the decorative feature.

17. The smoking apparatus of claim 15, wherein an outer surface of the outer layer has a shape that includes relief features that replicate surface features of the main body.

18. The smoking apparatus of claim 15, wherein an outer surface of the outer layer has a shape which is substantially dissimilar to the outer shape of the main body.

19. The smoking apparatus of claim 15, wherein a power source is configured to supply power to an electrical component positioned within the main body or outer layer.

20. The smoking apparatus of claim 1, wherein the main body has a sidewall thickness around the aperture such that the main body forms a rim around a periphery of the aperture and the outer layer is spaced away from the aperture around the periphery of the aperture at the rim by the sidewall thickness.

21. The smoking apparatus of claim 4, wherein the decorative feature is contained in the outer layer.

22. The smoking apparatus of claim 8, wherein the main body is formed of a material having an elastically deformable property.

* * * * *